United States Patent
Teng et al.

(10) Patent No.: US 11,949,526 B1
(45) Date of Patent: Apr. 2, 2024

(54) DYNAMIC VIDEO LAYOUT DESIGN DURING ONLINE MEETINGS

(71) Applicant: Cisco Technology, Inc., San Jose, CA (US)

(72) Inventors: Yun Teng, Fremont, CA (US); Wen Jiang, Fremont, CA (US); Shujun Han, Shanghai (CN); Yiqun Wang, Shanghai (CN); Lin Wang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/532,137

(22) Filed: Nov. 22, 2021

Related U.S. Application Data

(60) Provisional application No. 63/231,774, filed on Aug. 11, 2021.

(51) Int. Cl.
*H04L 12/18* (2006.01)
*G06F 3/04845* (2022.01)
*H04N 7/15* (2006.01)

(52) U.S. Cl.
CPC ...... *H04L 12/1818* (2013.01); *G06F 3/04845* (2013.01); *H04N 7/15* (2013.01)

(58) Field of Classification Search
CPC .... H04L 12/1818; G06F 3/04845; H04N 7/15
USPC ...................................................... 709/204
See application file for complete search history.

(56) References Cited

U.S. PATENT DOCUMENTS

| 9,756,286 | B1* | 9/2017 | Faulkner | H04L 65/1093 |
|---|---|---|---|---|
| 2011/0205333 | A1* | 8/2011 | Wu | H04N 7/152 348/E7.083 |
| 2012/0140681 | A1* | 6/2012 | Kaminsky | H04L 65/403 370/261 |
| 2012/0166534 | A1* | 6/2012 | Bentley | H04L 12/1822 709/204 |
| 2012/0182381 | A1* | 7/2012 | Abate | H04L 12/1822 348/E7.083 |
| 2013/0194378 | A1* | 8/2013 | Brown | H04N 7/152 348/14.09 |
| 2014/0317532 | A1 | 10/2014 | Ma et al. | |
| 2016/0014370 | A1* | 1/2016 | Xie | H04L 65/1059 348/14.02 |
| 2016/0227165 | A1 | 8/2016 | Moorjani et al. | |
| 2017/0237788 | A1 | 8/2017 | Xi et al. | |
| 2018/0063480 | A1 | 3/2018 | Luks et al. | |

(Continued)

OTHER PUBLICATIONS

Webex, "What's New in Webex—Update 41.6" retrieved from https://www.btconferencing.com/downloads-library/services/webex-versions/t41/Webex_Latest_Channel_Customer_Monthly_Update_41.6.pdf, Cisco, Jun. 24, 2021 (Year: 2021).*

*Primary Examiner* — Clayton R Williams
*Assistant Examiner* — Chong G Kim
(74) *Attorney, Agent, or Firm* — Edell, Shapiro & Finnan, LLC

(57) ABSTRACT

Presented herein is a stage area for "focused" video that is configured to allow for dynamic layout changes during an online video conference or meeting. By providing a user interface environment that allows a user (meeting participant) to customize the stage, each participant can choose their own view, and the meeting host can fully customize a view for every participant in the meeting.

20 Claims, 23 Drawing Sheets

(56) References Cited

U.S. PATENT DOCUMENTS

2019/0377586 A1    12/2019  Faulkner et al.
2020/0186887 A1*   6/2020   Kwon .................... G11B 27/34

* cited by examiner

2200

```
┌─────────────────────────────────────────────────────────────────┐
│ CONNECTING A PLURALITY OF USER DEVICES TO A COMMUNICATION       │──2202
│ SESSION IN WHICH A HOST OF THE COMMUNICATION SESSION AND A      │
│ PLURALITY OF PARTICIPANTS OF THE RESPECTIVE PLURALITY OF USER   │
│ DEVICES COMMUNICATE                                             │
└─────────────────────────────────────────────────────────────────┘
                                 │
                                 ▼
┌─────────────────────────────────────────────────────────────────┐
│ PROVIDING, TO A USER DEVICE OF A FIRST PARTICIPANT, A USER      │──2204
│ INTERFACE INCLUDING A PLURALITY OF AREAS FOR DISPLAYING CONTENT │
│ ASSOCIATED WITH THE COMMUNICATION SESSION, THE USER INTERFACE   │
│ INCLUDING A FIRST AREA FOR DISPLAYING FOCUSED CONTENT, THE      │
│ FIRST AREA BEING LARGER THAN OTHER AREAS OF THE PLURALITY OF    │
│ AREAS                                                           │
└─────────────────────────────────────────────────────────────────┘
                                 │
                                 ▼
┌─────────────────────────────────────────────────────────────────┐
│ RECEIVING, FROM THE FIRST PARTICIPANT, A REQUEST TO MOVE FIRST  │──2206
│ CONTENT BEING DISPLAYED IN A SECOND AREA OF THE PLURALITY OF    │
│ AREAS TO BE DISPLAYED IN THE FIRST AREA                         │
└─────────────────────────────────────────────────────────────────┘
                                 │
                                 ▼
┌─────────────────────────────────────────────────────────────────┐
│ DISPLAYING THE FIRST CONTENT IN THE FIRST AREA                  │──2208
└─────────────────────────────────────────────────────────────────┘
```

DYNAMIC VIDEO LAYOUT DESIGN DURING ONLINE MEETINGS

CROSS REFERENCE TO RELATED APPLICATION

This application claims priority to U.S. Provisional Application No. 63/231,774, filed Aug. 11, 2021, the entirety of which is incorporated herein by reference.

TECHNICAL FIELD

The present disclosure relates to online video meetings/conferences.

BACKGROUND

There are many different types of video layouts used in online video conferences, such as voice-switched layout (with or without thumbnail strip), gallery view, voice switched grid, etc. Each layout type has its advantages, but existing layout types are inflexible in that they allow for only a minimum range of adjustments/changes during a meeting. However, no layout type allows the user to decide which other participants are viewed in a larger window.

BRIEF DESCRIPTION OF THE DRAWINGS

FIG. 22 is a flowchart illustrating a method for allowing a user to customize content displayed in the stage, according to an example embodiment.

DESCRIPTION OF EXAMPLE EMBODIMENTS

Overview

In an online meeting space environment, participants and/or users (these terms are used interchangeably throughout the description) are participating via their respective devices that may be geographically remote from each other. The participant and the respective user (client) device, such as a computer, laptop, tablet, smart phone, etc., may collectively be referred to as meeting endpoints, endpoints, user devices, or devices. The devices may communicate with each other via one or more networks such as the Internet.

Some of the devices may have video capabilities in a communication session. Video capabilities may include, but are not limited to, live feed of a respective participant on a user interface screen. Other devices may not have video capabilities in the communication session and may only have audio capabilities. Further, some of the devices may have interactive connectivity to manipulate content on the user interface screen and other devices may have view-only capability to be able only to view content during the collaboration session. These are just some examples and are not provided by way of a limitation.

A participant may view content associated with the communication session (e.g., names and/or video streams associated with other participants, content shared from other user devices, etc.) on a device. The device may display a number of widows or areas, each window/area displaying content associated with the communication session. Techniques presented herein involve providing a user interface with a "stage area" for displaying content that is configured to allow for dynamic layout changes during the communication session, online video conference, or meeting. The stage area or stage (these terms are used interchangeably herein) may be an area or window that is larger than any other area or window and displays "focused" content. For example, a hearing-impaired user may move a sign language interpreter to the stage, so that the interpreter is always visible and the sign language view is large enough to see. As another example, an event organizer may move speakers to the stage and synchronize a meeting host's stage to the meeting so that every participant in the meeting can always focus on the speakers. As another example, content being shared by another participant (e.g., the participant's screen, a presentation, etc.) may be moved to the stage so other participants may easily view the content.

By providing a user interface environment that allows a user or meeting participant to customize the stage, participants may choose their own view. In addition, a meeting host may fully customize a view for every participant in the meeting.

Example Embodiments

Figure 1:
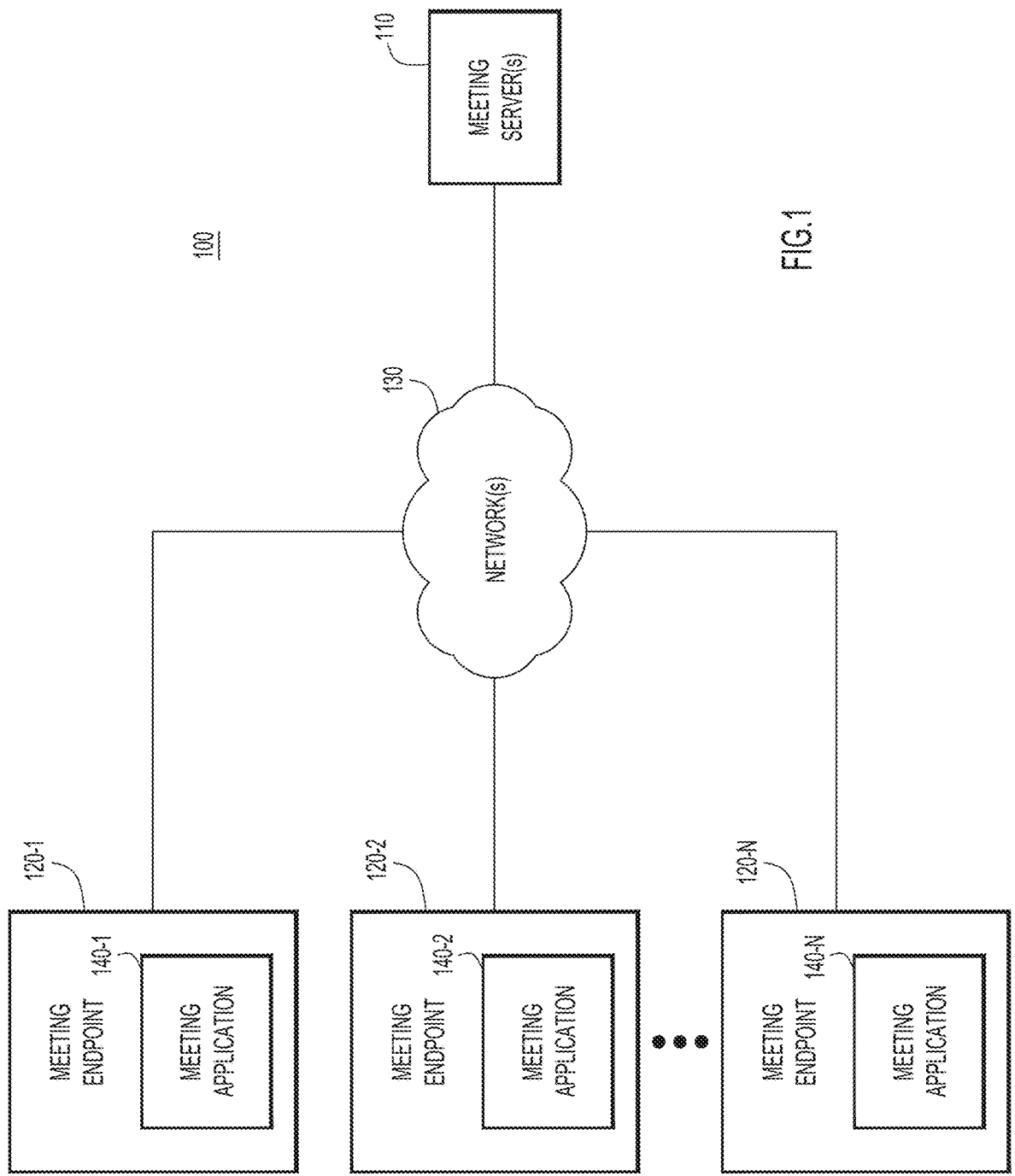
FIG. 1 shows is a block diagram of an online video conference/meeting system configured to support dynamic video layout design during meetings, according to an example embodiment.

FIG. 1 is a block diagram of an online meeting/conference system 100 that includes a meeting server 110 (or multiple meeting servers) and a plurality of meeting endpoints 120-1, 120-2, . . . , 120-N that communicate with the meeting server 110 via network(s) 130. The meeting server(s) 110 are configured to provide an online meeting service for hosting a communication session among meeting endpoints 120-1 to 120-N.

The meeting endpoints 120-1 to 120-N may be tablets, laptop computers, desktop computers, Smartphones, virtual desktop clients, or any user device now known or hereinafter developed that can run a meeting client or similar communication functionality. The meeting endpoints 120-1 to 120-N may have a dedicated physical keyboard or touchscreen capabilities to provide a virtual on-screen keyboard to enter text. The network(s) 130 may include wired local and wide-area networks as well as wireless local and wide-area networks. The meeting endpoints 120-1 to 120-N may also have short-range wireless system connectivity (such as Bluetooth™ wireless system capability, ultrasound communication capability, etc.) to enable local wireless connectivity with a videoconference endpoint in a meeting room or with other user devices in the same meeting room.

The meeting endpoints 120-1-120-N may execute a corresponding meeting application 140-1-140-N to provide communication to the meeting server(s) 110 and control user participation in an online meeting that is supported by the meeting server(s) 110. The meeting server(s) 110 and the meeting applications 140-1-140-N are configured to support the dynamic video layout design techniques during online meetings.

Figure 2:
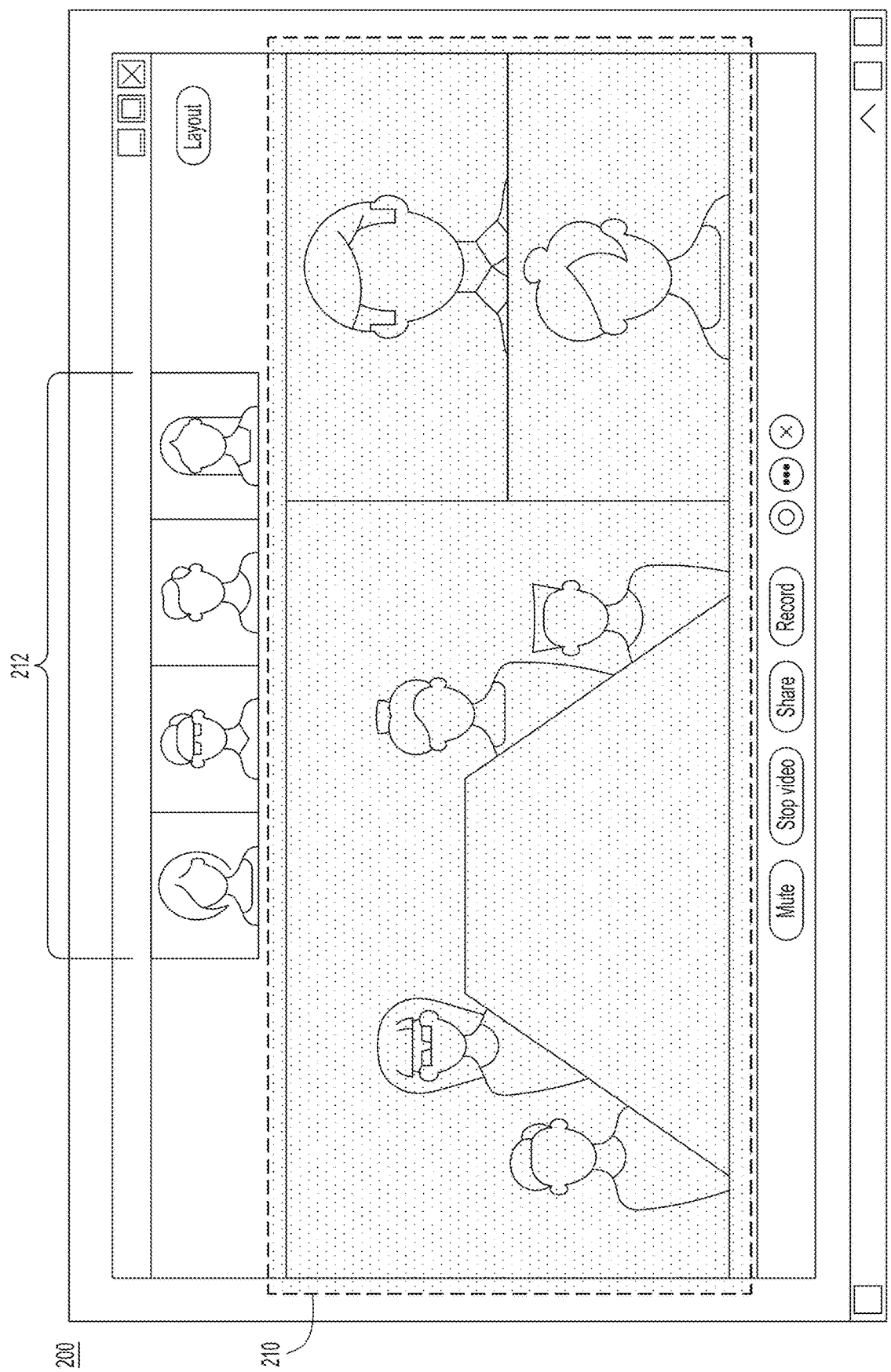
FIG. 2 is a diagram of a user interface screen that illustrates a "stage" portion of a user interface that is used to allow for dynamic video layout design during online meetings/conferences, according to an example embodiment.

Reference is now made to FIG. 2, which illustrates a user interface screen 200 that includes a stage 210 and a filmstrip 212. The stage 210 (outlined by the dashed box) is presented to a meeting participant during an online meeting and may include "focused" content for the meeting participant. For example, the stage 210 can contain an active speaker's video, shared content, selected video streams (also referred to herein as "videos") of other meeting participants, or combinations thereof. A user (meeting participant) can customize the stage 210 just for himself/herself, or for every participant in the meeting if the user is the host or meeting organizer. As illustrated in FIG. 2, the area of the stage 210 is larger than the other areas/windows, such as the areas/windows in filmstrip 212. Filmstrip 212 may include (smaller) video streams of other participants in the online meeting and/or additional videos or content.

A user can select one or multiple videos or other content from a filmstrip 212 or the participant's list (not shown in FIG. 2), and move the video(s)/content to the stage using a cursor or using a "move to stage" operation in a contextual menu.

In addition, the users can rearrange the video(s)/content in the stage area by dragging the video(s)/content around to change location or the size of the video(s)/content. In addition, a user may choose or upload a background for the stage and/or add a company logo to the stage.

In one embodiment, the meeting participants can be separated into different groups and controlled as groups so that operations (e.g., mute/unmute a group, move a group to the stage, etc.) are performed for all participants in the group. The group control function may be useful for situations such as court/legal proceedings, group debate, group presentation in a class, etc.

Because each user is able to customize the content included in the stage on his or her device, the stage gives each participant more freedom to customize the view based on his or her needs without interrupting the experience of other meeting participants. In addition, the stage allows a meeting host to make an online meeting more engaging, and is useful for training, events, all-hands meetings, etc.

Variations of the Stage

Figure 3:
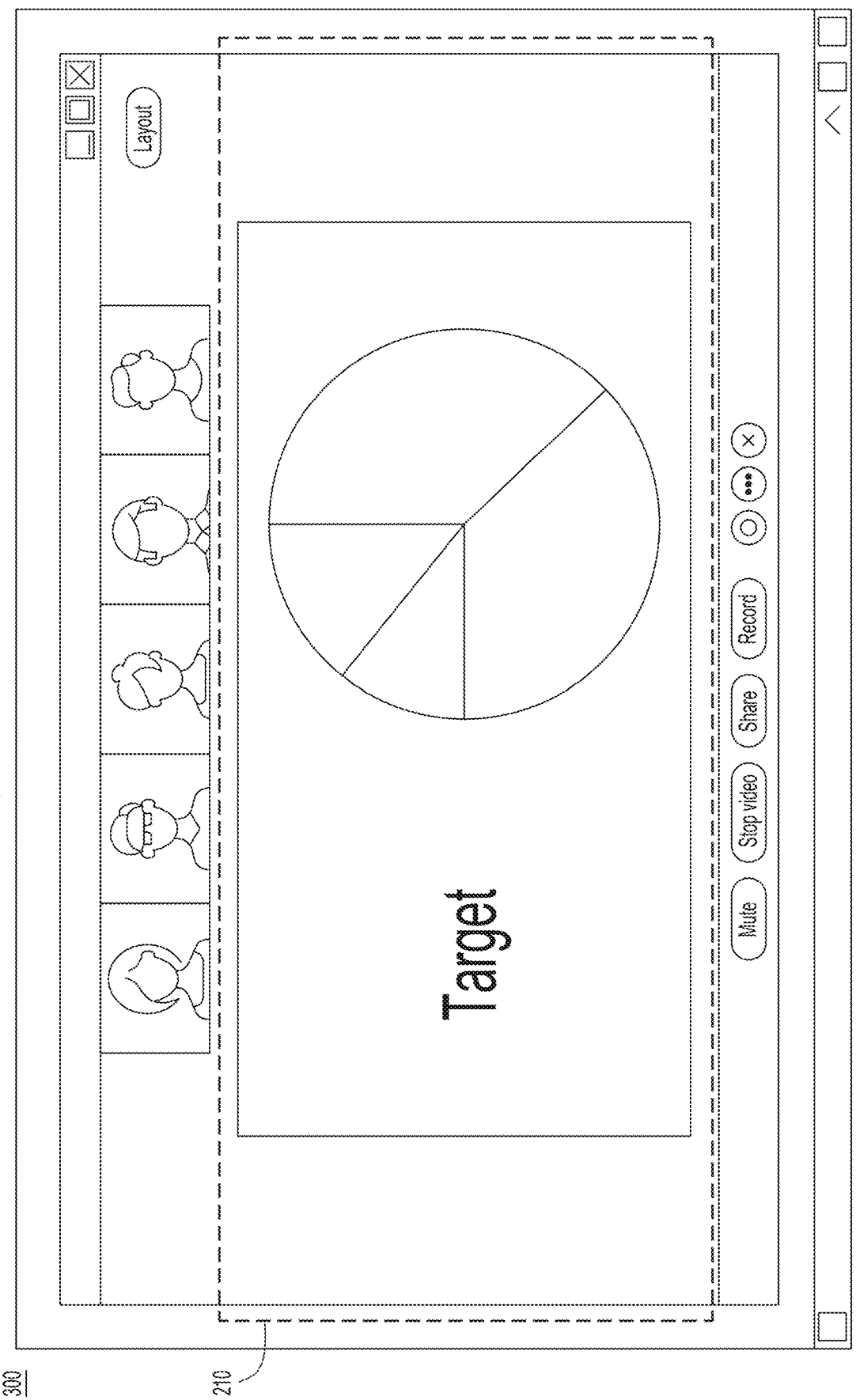
FIG. 3 is a diagram of a user interface screen showing the stage displaying shared content only, according to an example embodiment.

FIG. 3 illustrates a user interface screen 300 in which the stage 210 is used for shared content only. For example, a participant may share a screen, picture, presentation, etc. from his or her meeting endpoint and another user may see the stage 210 with the shared content as a default view.

Figure 4:
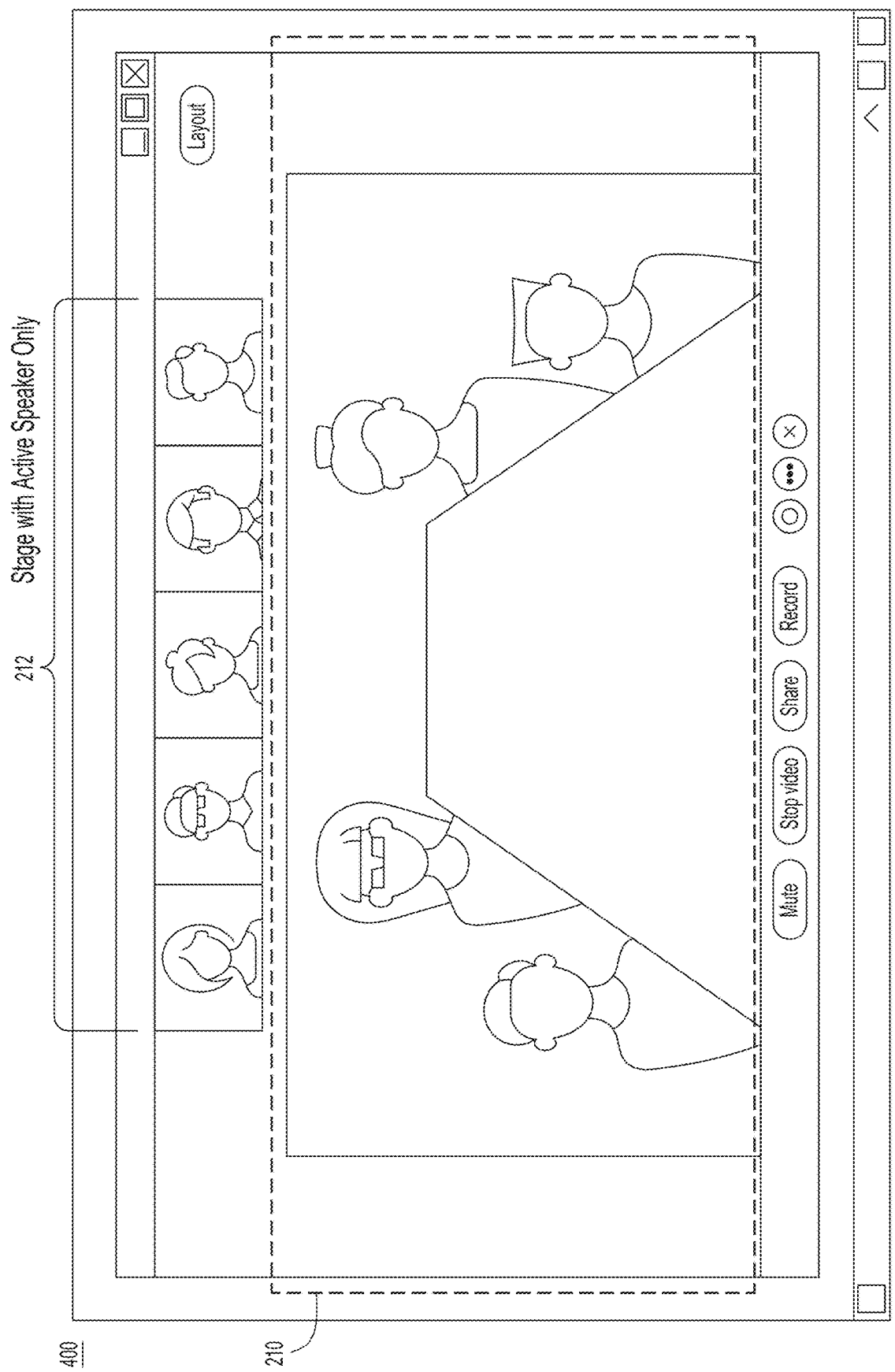
FIG. 4 is a diagram of a user interface screen showing the stage displaying active speaker content only, according to an example embodiment.

FIG. 4 illustrates a user interface screen 400 in which the stage 210 is used for an active speaker only. In the example shown in FIG. 4, the video stream displayed in the stage 210 changes based on which participant is speaking. For example, if a participant whose video stream is displayed in filmstrip 212 begins to speak, the video stream of the speaker may replace the video stream displayed in the stage 210. In this situation, the video stream previously shown in the stage 210 may be relocated to the filmstrip 212 until a participant in the video stream speaks.

Figure 5:
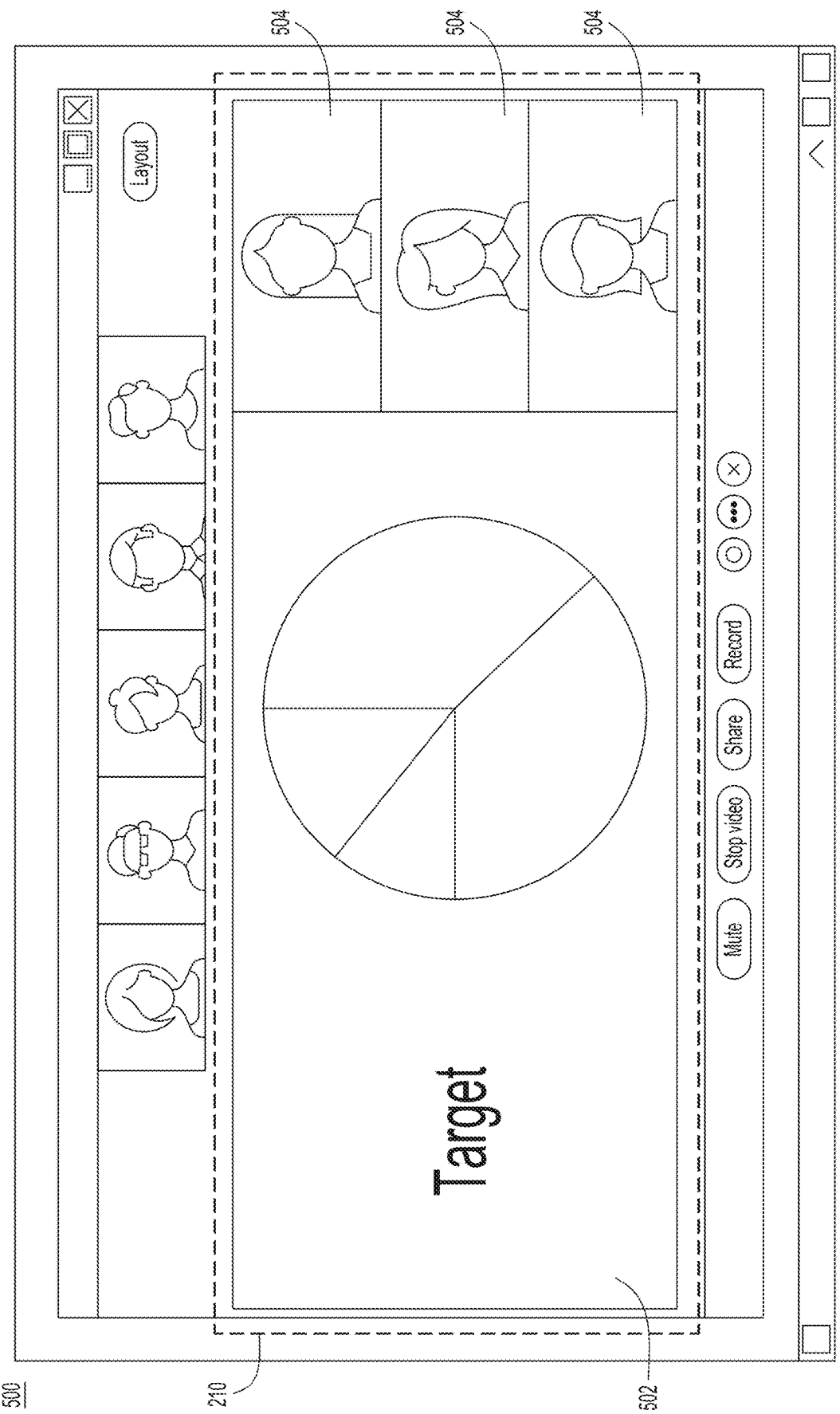
FIG. 5 is a diagram of a user interface screen showing the stage displaying shared content and selected videos, according to an example embodiment.

FIG. 5 illustrates a user interface screen 500 in which the stage 210 includes shared content 502 and multiple selected video streams 504. FIG. 5 shows that the stage 210 includes selected video streams 504 from three selected meeting participants, however any number of selected video streams 504 may be included in the stage 210. In addition, while FIG. 5 shows that shared content 502 is larger than each of the selected video streams 504, the size of the windows in the stage 210 may be customized by a user.

As described further below, the user may rearrange the locations of the shared content 502 and selected video streams 504. Selected video streams 504 may include video streams of participants chosen by a user. For example, a user may select the selected video streams 504 by dragging the selected video streams from the filmstrip 212 to the stage 210, as described below with respect to FIG. 9. In another example, a user may choose the selected video streams 504 by choosing a "Move to stage" option from a menu associated with the selected video streams 504 or users associated with the selected video streams 504, as further described below with respect to FIGS. 8 and 10. Additionally, the user may choose to include the shared content 502 in the stage 210 by dragging the shared content 502 to the stage 210 or by choosing a "Move to stage" option on a menu associated with the shared content or a participant associated with the shared content.

Figure 6:
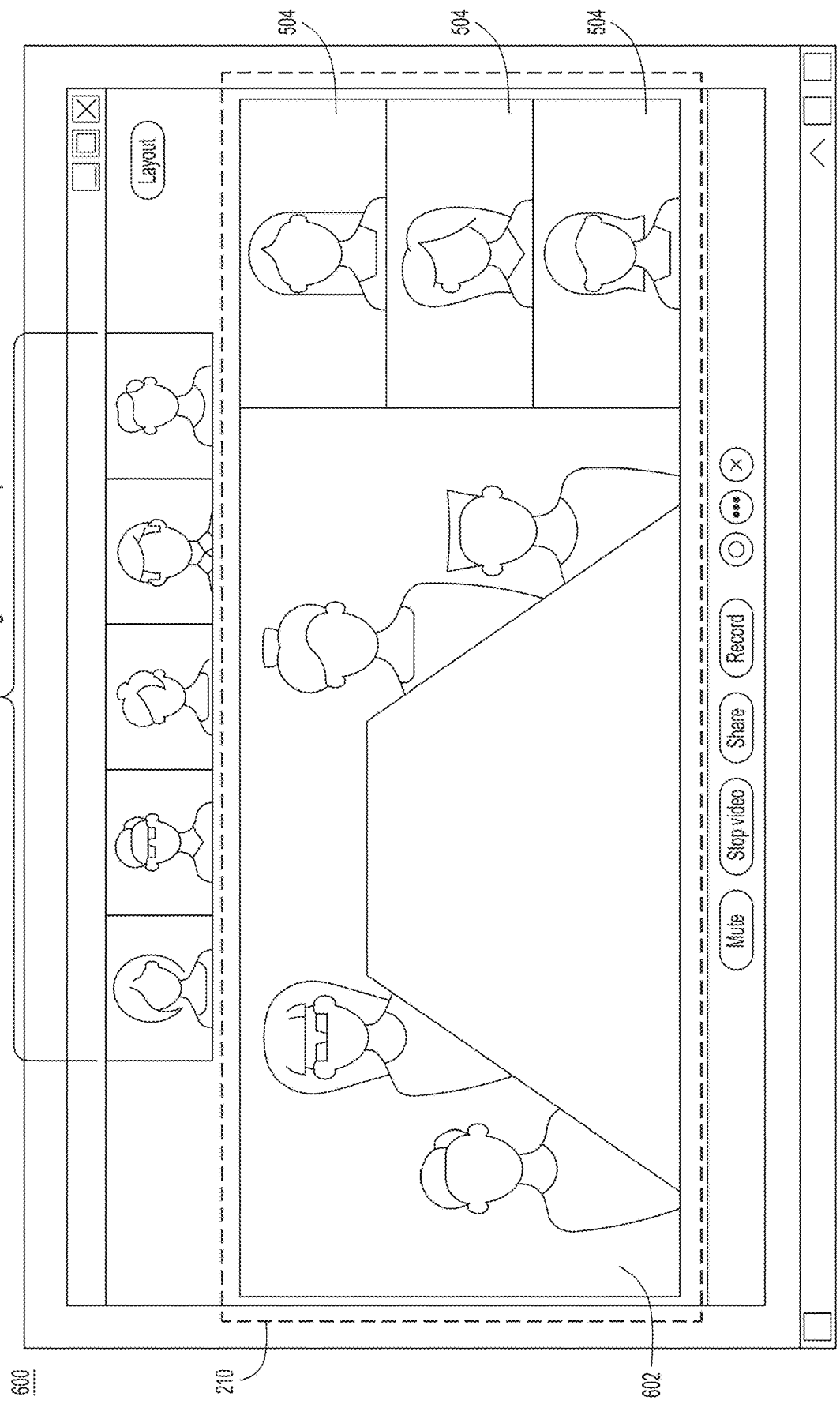
FIG. 6 is a diagram of a user interface screen showing the stage displaying active speaker content and selected videos, according to an example embodiment.

FIG. 6 illustrates a user interface screen 600 in which the stage 210 includes an active speaker video stream 602 and multiple selected video streams 504. FIG. 6 shows that the stage 210 includes selected video streams 504 from three selected meeting participants, however any number of selected video streams 504 may be included in the stage 210. In addition, while FIG. 6 shows that active speaker video stream 602 is larger than each of the selected video streams 504, the size of the windows in the stage 210 may be customized by a user.

As described further below, the user may rearrange the locations of the active speaker video stream 602 and selected video streams 504. Selected video streams 504 may include video streams of participants chosen by a user. For example, a user may select the selected video streams 504 by dragging the selected video streams from the filmstrip 212 to the stage 210, as described below with respect to FIG. 9. In another example, a user may choose the selected video streams 504 by choosing a "Move to stage" option from a menu associated with the selected video streams 504 or users associated with the selected video streams 504, as further described below with respect to FIGS. 8 and 10. In addition, the user may customize the stage 210 to include active speaker video stream 602 by, for example, choosing an option on a menu.

Figure 7:
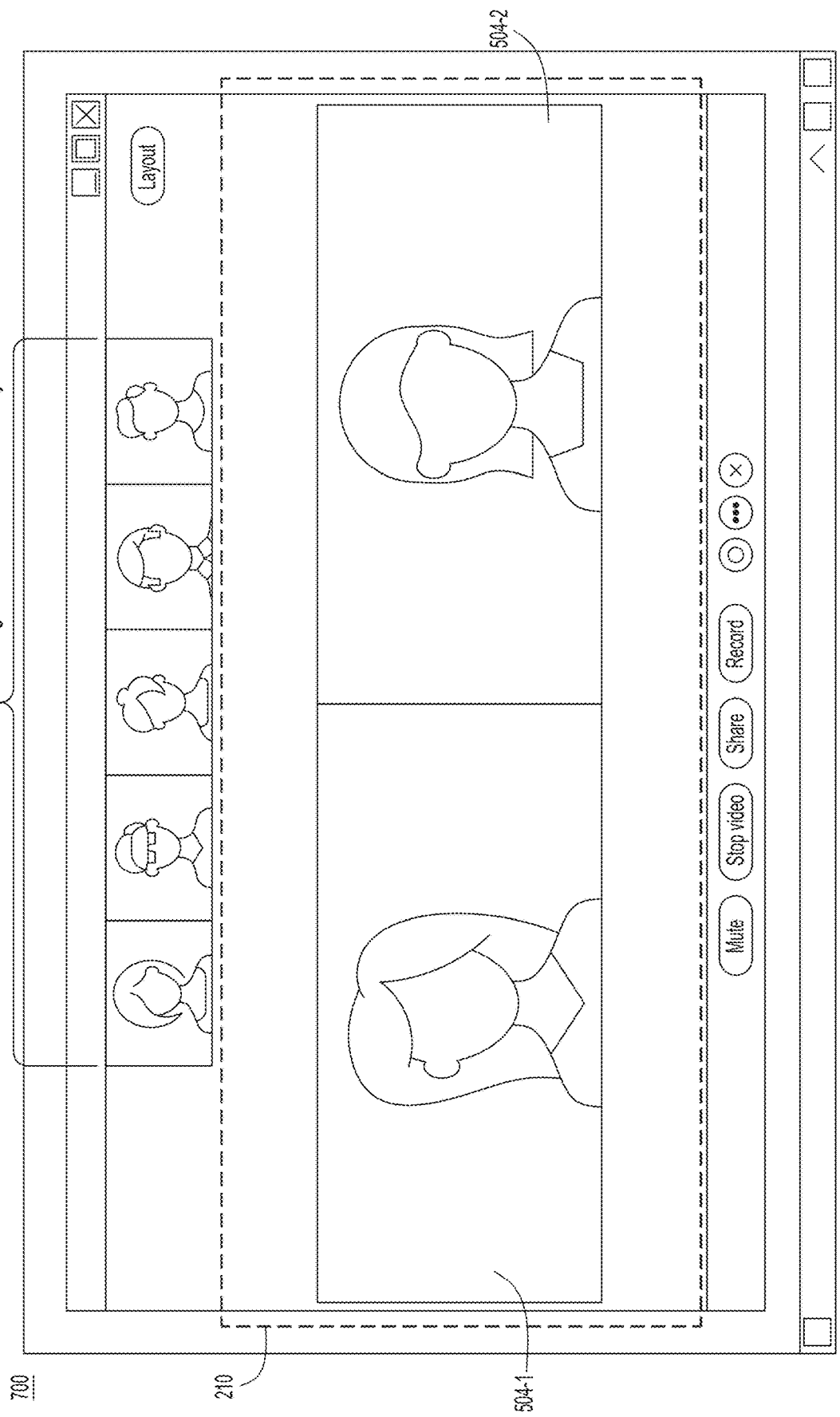
FIG. 7 is a diagram of a user interface screen showing the stage displaying selected videos only, according to an example embodiment.

FIG. 7 illustrates a user interface screen 700 in which the stage 210 includes selected video streams 504 only. Although FIG. 7 shows that the stage 210 includes two selected video streams 504 (selected video stream 504-1 and selected video stream 504-2), any number of selected video streams 504 may be included in the stage 210. Selected video streams 504-1 and 504-2 may be selected by dragging the selected video streams 504 from the filmstrip 212, as further described below with respect to FIG. 9, or by selecting a "Move to stage" option from a menu associated with the selected video stream 504 or a participant associated with the selected video stream 504, as further described below with respect to FIGS. 8 and 10.

The user interface screens described with respect to FIGS. 3-7 are exemplary only and the stage 210 may include any combination of shared content 502, selected video streams, active speaker video streams 602, or windows/areas that include different content. In addition, the size and location of windows within the stage 210 may vary based on user customization of the stage 210.

Moving to Stage

Figure 8:
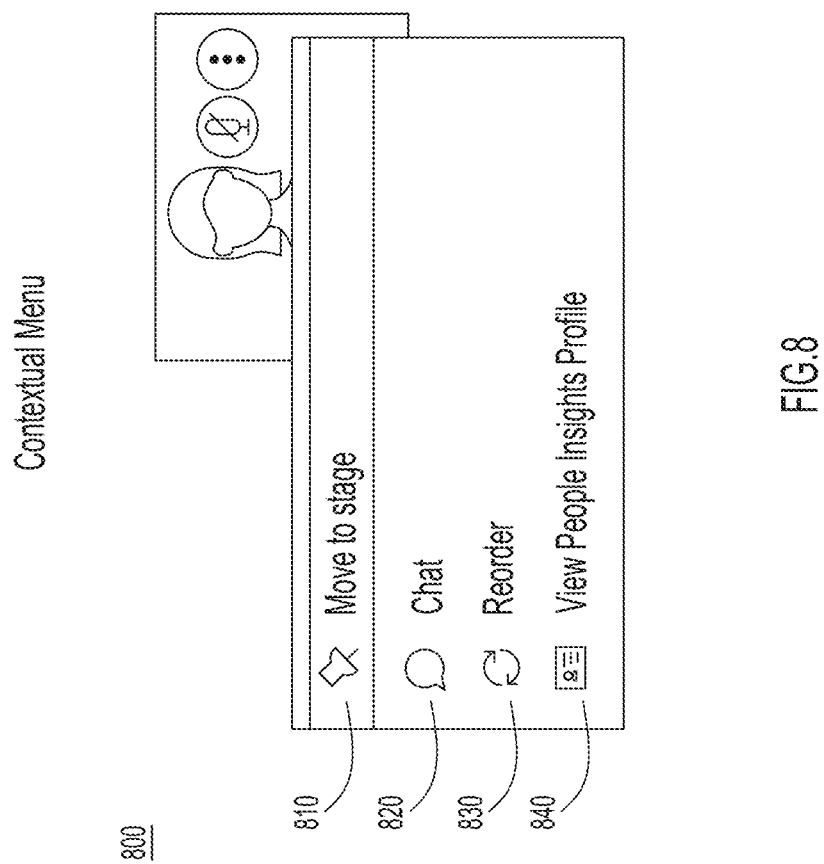
FIG. 8 is a diagram of a user interface screen illustrating a contextual menu that includes an option to move content to the stage, according to an example embodiment.

FIG. 8 illustrates a contextual menu 800 that may be used to allow a user to move content associated with a participant to the stage 210. Contextual menu 800 may be presented by putting a mouse cursor over or right clicking a mouse on a thumbnail of name, picture, or video associated with that participant. Contextual menu 800 includes a "Move to stage" option 810, a "Chat" option 820, a "Reorder" option 830, and a "View People Insights profile" option 840. When a user clicks on the "Move to stage" option 810, content associated with the participant (e.g., shared content, a video stream of the participant, etc.) may be moved to the stage 210.

Figure 9:
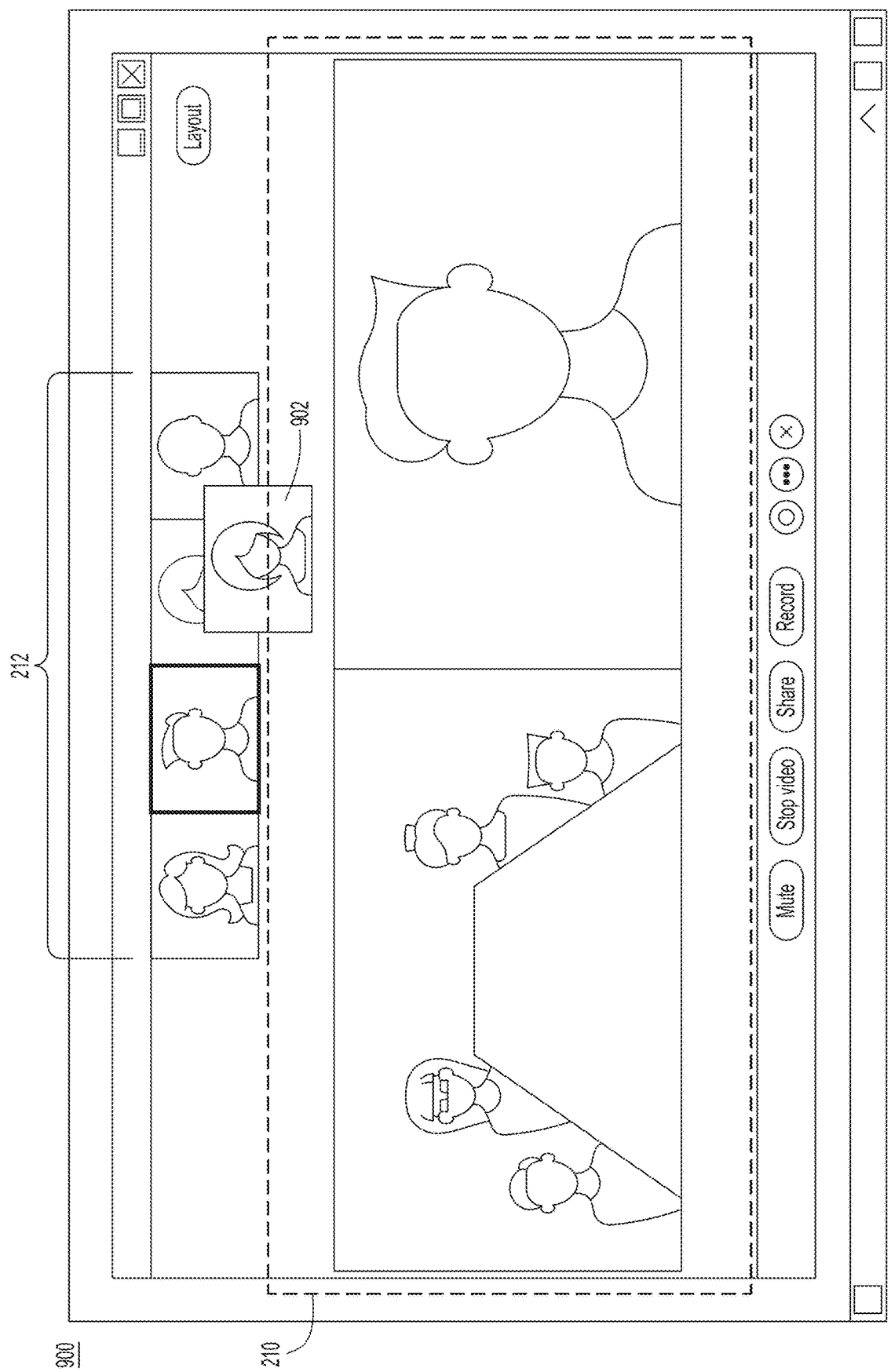
FIG. 9 is a diagram of a user interface screen illustrating an example in which content may be dragged to the stage, according to an example embodiment.

FIG. 9 shows a user interface screen 900 depicting moving content from the filmstrip 212 to the stage 210. For example, a user may select content from the filmstrip 212 and drag the content to the stage 210. In the example shown in FIG. 9, a user has selected video stream 902 from filmstrip 212 using a cursor (e.g., by clicking on a mouse when the cursor is on video stream 902, by selecting video stream 902 with a finger, etc.) and the user has dragged video stream 902 toward the stage (e.g., by holding the mouse button while moving the cursor toward the stage 210, dragging the video stream 902 to the stage 210 using a finger, etc.). In this example, when the user releases the mouse button or lifts his or her finger, the stage 210 will include three windows. The user may additionally remove content from the stage 210 by dragging a video stream from the stage 210 to the filmstrip 212. In this way, the user may easily select which video streams are displayed in the stage 210 and may customize the number of video streams or other content displayed in the stage 210.

Figure 10:
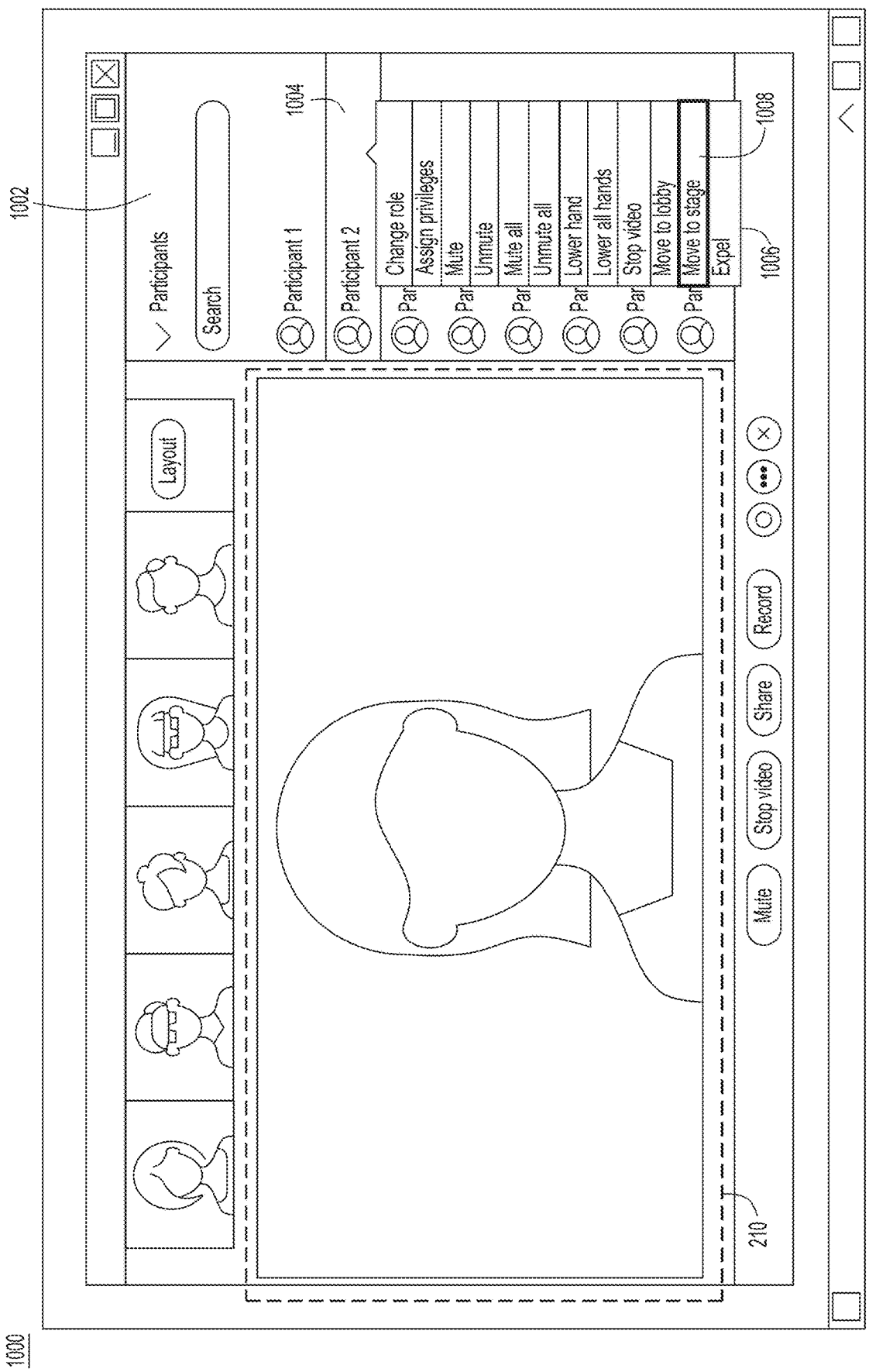
FIG. 10 is a diagram of a user interface screen illustrating a participants list including a contextual menu that includes an option to move content to the stage, according to an example embodiment.

FIG. 10 illustrates a user interface screen 1000 that may be used to allow a user to move content associated with a participant to the stage by opening a contextual menu 1006 (similar to contextual menu 800 shown in FIG. 8), from the meeting participants list 1002. Meeting participants list 1002 may include a list of all participants participating in the online meeting. When a user selects a participant's name (e.g., participant 1004 "Participant 2") from the participants list 1002, menu 1006 may be presented. Menu 1006 includes a "Move to stage" option 1008 (similar to the "Move to stage" option 810 in FIG. 8). A user may select the "Move to stage" option 1008 to move content associated with participant 1004 (e.g., a video stream, shared content, etc.) to the stage 210.

Synchronizing the Stage to the Meeting

Figure 11:
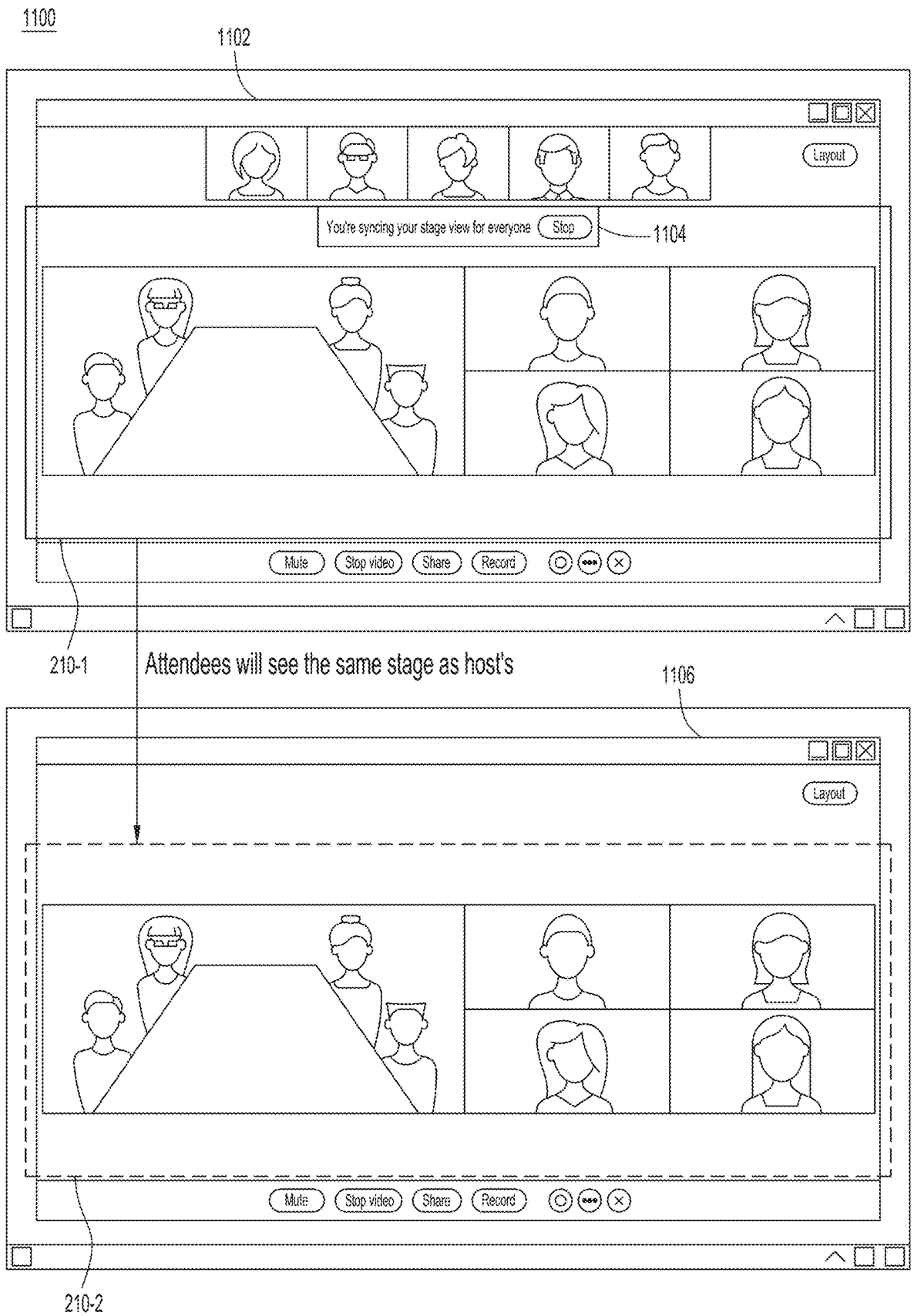
FIG. 11 is a diagram of user interface screens that illustrate synchronization of the video layout of a meeting host's stage to the stage of other meeting participants, according to an example embodiment.

FIG. 11 illustrates a user interface 1100 that shows how a meeting organizer or meeting host can synchronize his or her customized stage 210-1 to the meeting so that the participants' stages 210-2 look the same as the meeting organizer or host's stage 210-1. As illustrated in FIG. 11, the meeting host/organizer may customize his or her stage 210-1 on user interface 1102 and may choose an option to synchronize the host's stage view for everyone in the meeting. The host's user interface 1102 includes a synchronization indication 1104 that says, "You're syncing your stage view for everyone" with an option to stop the synchronization. As shown in FIG. 11, the attendees' or other participants' stages 210-2 on user interface 1106 show the same content in the same arrangement as the host's stage 210-1. In other words, stages 210-1 and 210-2 are synchronized and are identical. Additionally, when the meeting organizer/host initiates recording of the meeting, the recording will contain the content of the stage 210-1 as customized by the meeting host and synchronized to the meeting participants.

When the host no longer wants to synchronize the stages, the host may select the "Stop" option at the synchronization indication 1104. When the host stops synchronizing the stages, a user may customize his or her own stage.

Customization of the Stage

Figure 12:
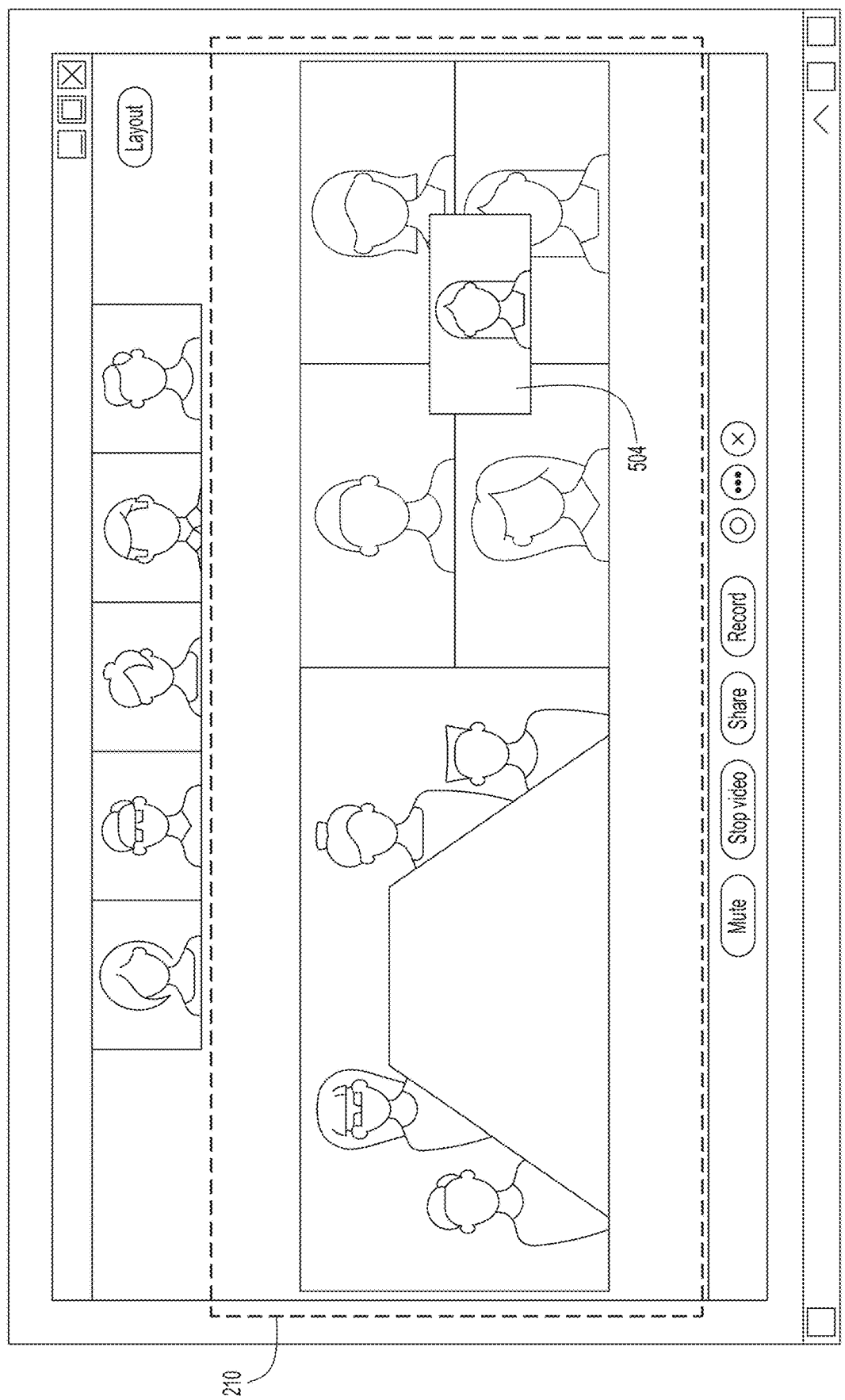
FIG. 12 is a diagram of a user interface screen illustrating reordering of videos in the stage, according to an example embodiment.

FIG. 12 illustrates a user interface screen 1200 that illustrates how a user may reorder content in the stage 210. As illustrated in FIG. 12, a user may select a window/area in the stage 210 (e.g., selected video stream 504) and move the window/area to a new location within the stage 210. For example, a user may select selected video stream 504 with a cursor (e.g., by clicking on the video with a mouse) or by another means (e.g., selecting the selected video stream 504 with a finger or stylus) and may drag the selected video stream 504 to a new location within the stage 210. The user may additionally alter the size of video stream 504 by moving the video stream 504 to a new location (e.g., a location where the content is displayed in a different size). As described below with respect to FIG. 13, a user may additionally adjust the layout of the stage 210 so that content in different areas of the stage 210 are displayed as different sizes.

Figure 13:
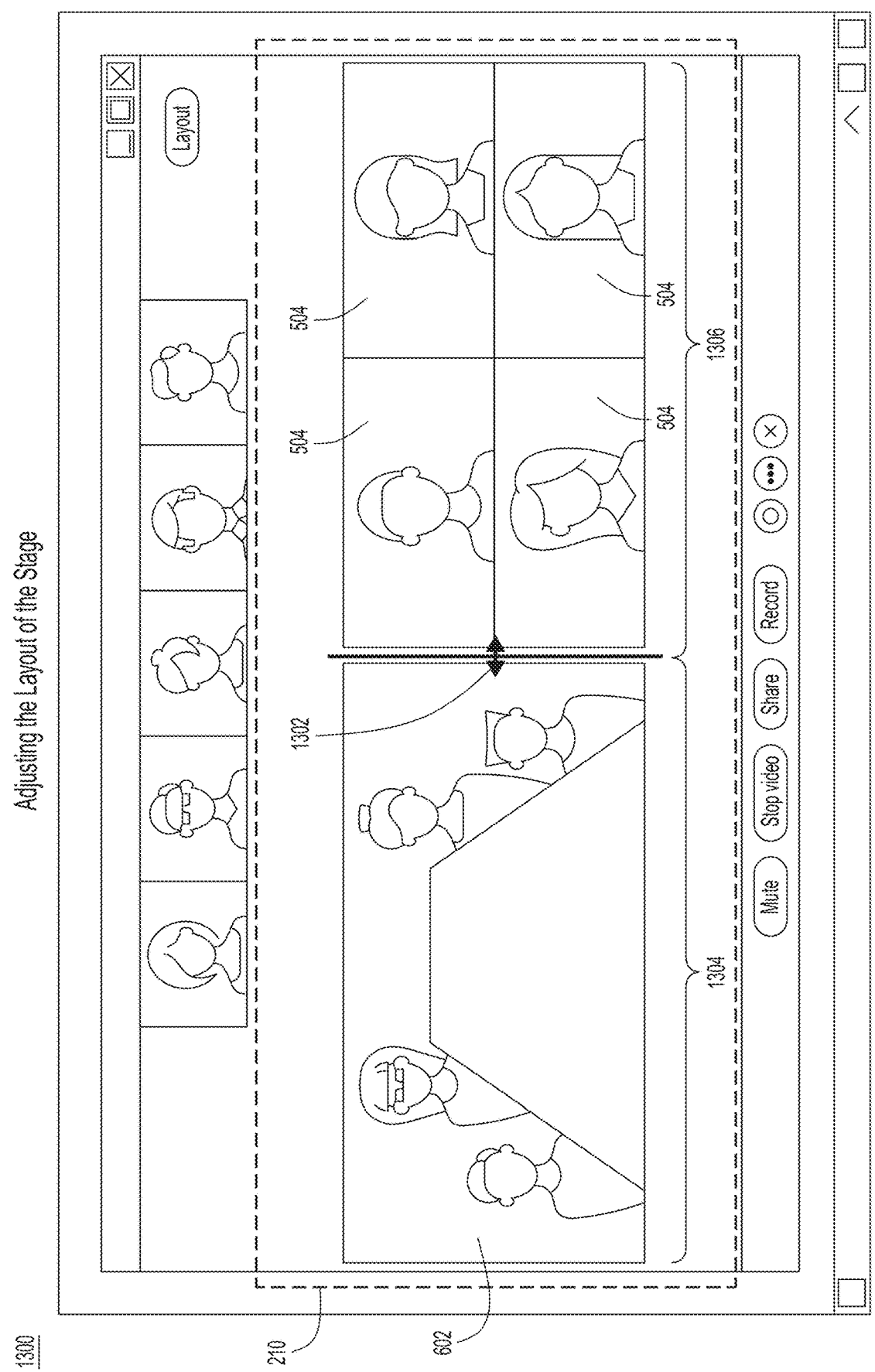
FIG. 13 is a diagram of a user interface screen illustrating adjusting the layout of the stage, according to an example embodiment.

FIG. 13 illustrates a user interface screen 1300 in which a user may adjust a layout of the stage 210. As shown in FIG. 13, stage 210 may include section 1304 and section 1306. A user may adjust the size of sections 1304 and 1306 by adjusting the selector 1302. For example, a user may move selector 1302 to the right to increase the size of section 1304 and decrease the size of section 1306. In the example shown in FIG. 13, moving the selector to the right may increase the size of active speaker video stream 602 and decrease the sizes of selected video streams 504. The user may also move the selector 1302 to the left to decrease the size of section 1304 and increase the size of section 1306. In the example shown in FIG. 13, moving the selector 1302 to the left may decrease the size of active speaker video stream 602 and increase the sizes of selected video streams 504.

Figure 14:
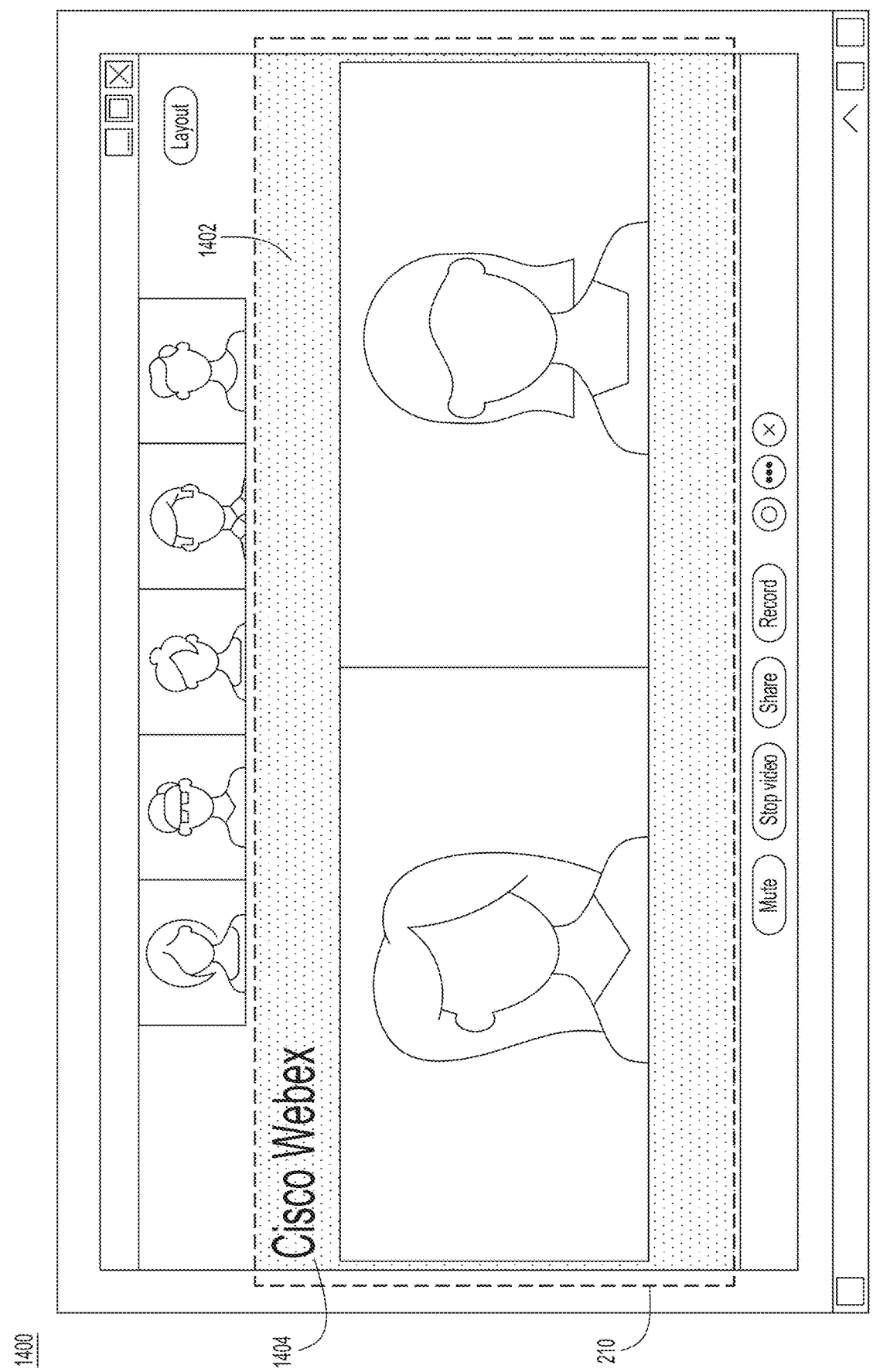
FIG. 14 is a diagram of a user interface screen illustrating customizing a background and a logo for the stage, according to an example embodiment.

FIG. 14 illustrates a user interface screen 1400 in which a user may choose or upload a background for the stage and add a company logo to the stage 210. For example, as shown in FIG. 14, a user may choose or upload a background 1402 for the stage 210. Additionally, a user may choose or upload a company logo 1404 or other text or graphic to the stage 210.

Multiple Selection and Grouping

Figure 15:
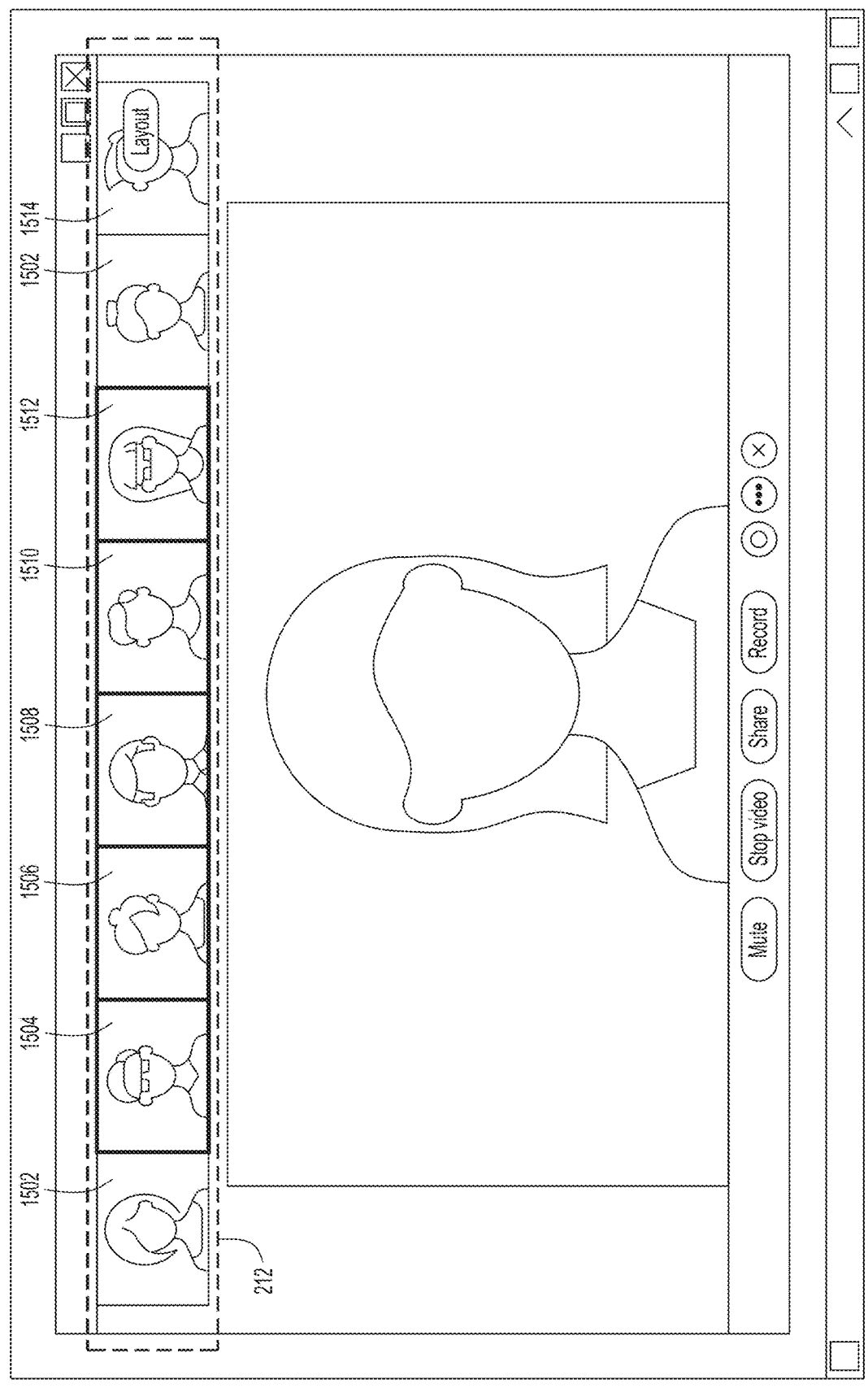
FIG. 15 is a diagram of a user interface screen illustrating selecting multiple videos from a filmstrip, according to an example embodiment.

FIG. 15 illustrates a user interface screen 1500 in which a user may select multiple videos or other content from the filmstrip 212. As shown in FIG. 15, a user has selected videos 1504, 1506, 1508, 1510, and 1512 (illustrated by the white box around the videos) from filmstrip 212. Videos 1502 and 1514 have not been selected. The user may select multiple videos 1504-1512 in any number of ways, such as by holding down a key (such as the shift key) while selecting the videos using a cursor, by holding a finger on a video for a period of time to indicate that multiple videos will be selected, or in another manner. The user may then move the multiple selected videos to the stage 210 at the same time.

Figure 16:
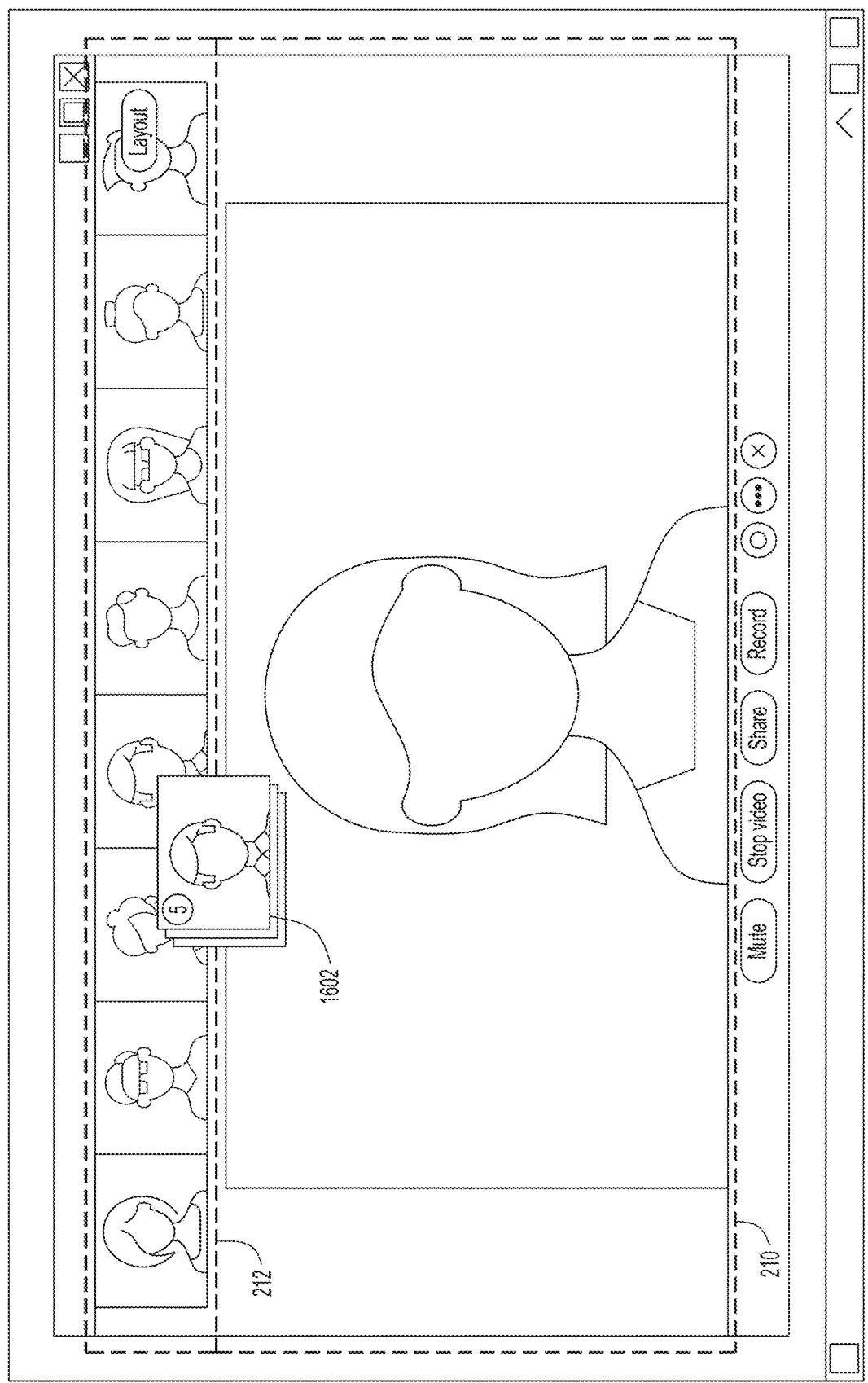
FIG. 16 is a diagram of a user interface screen illustrating moving multiple videos to the stage, according to an example embodiment.

FIG. 16 illustrates a user interface screen 1600 in which the multiple selected videos 1504-1512 are moved to the stage 210. As shown in FIG. 16, the selected videos 1602 are being moved from the filmstrip 212 toward the stage 210 by dragging the videos toward the stage 210 (e.g., with a cursor or the user's finger). The selected videos 1602 includes five videos, as illustrated by the "5" in the upper left corner of the selected videos 1602. When the selected videos 1602 have been moved to the stage 210, the stage 210 will include six videos or other content and the selected videos 1602 will no longer be included in the filmstrip 212.

Figure 17:
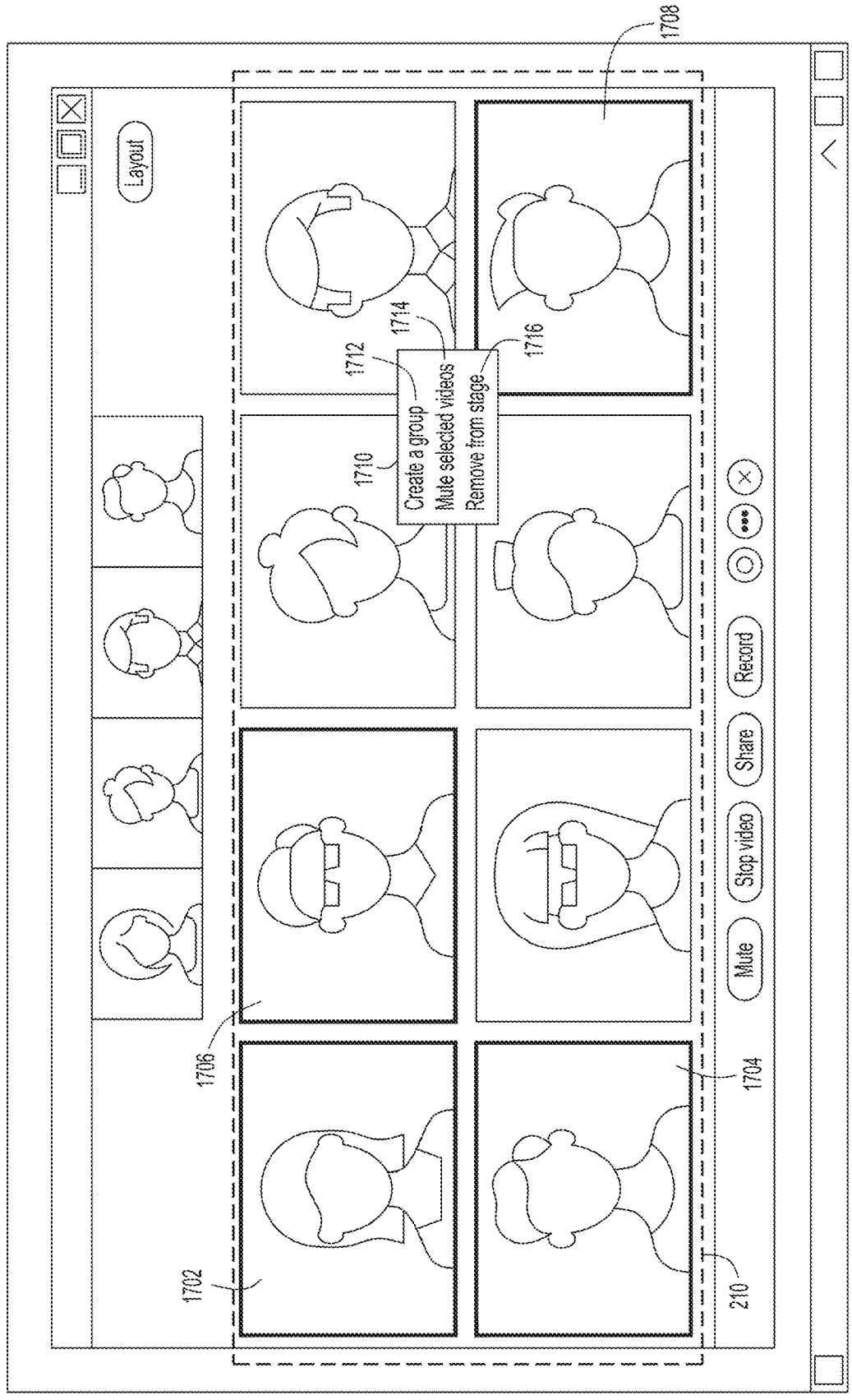
FIG. 17 is a diagram of a user interface screen illustrating selecting multiple videos in the stage and creating a group, according to an example embodiment.

FIG. 17 illustrates a user interface screen 1700 that allows a user to select multiple videos in the stage 210 to create a group. As shown in FIG. 17, the user has selected videos 1702, 1704, 1706, and 1708 (illustrated by the white box around the videos) from the stage 210. When the videos have been selected, the user may perform actions in association with the selected videos 1702-1708 using the contextual menu 1710. Contextual menu 1710 includes a "Create a group" option 1712, a "Mute selected videos" option 1714, and a "Remove from stage" option 1716. The "Create a group" option 1712 allows a user to create a group with the participants associated with the selected videos 1702-1708 and perform actions associated with all participants/videos in the group (e.g., muting/unmuting, moving videos to/from the stage 210) at the same time.

Figure 18:
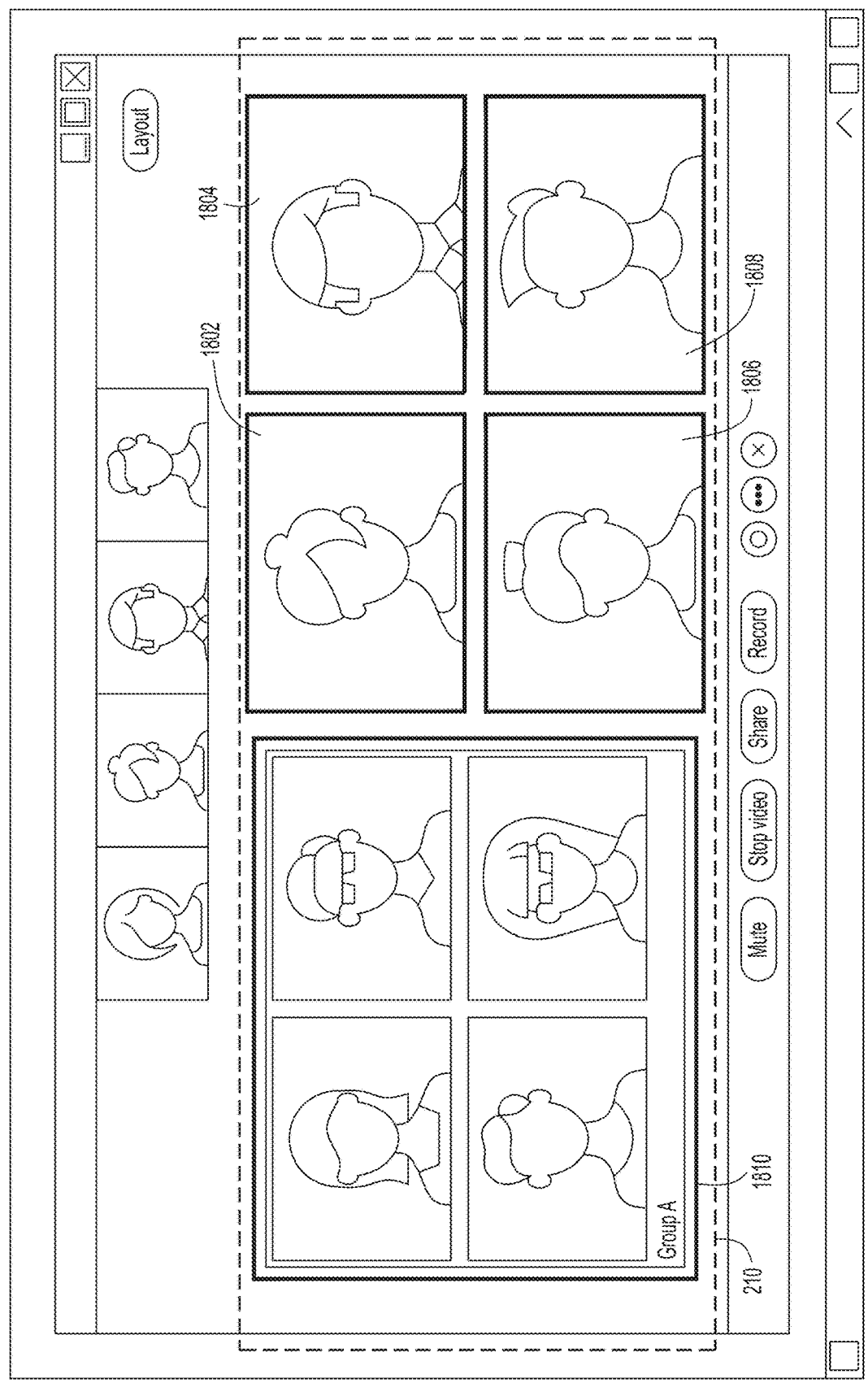
FIG. 18 is a diagram of a user interface screen illustrating selecting multiple videos in the stage, according to an example embodiment.

FIG. 18 illustrates a user interface screen 1800 that allows a user to select multiple videos in the stage 210 by drawing an area around the videos. As shown in FIG. 18, the user has selected videos/windows 1802, 1804, 1806, and 1808 by drawing an area around the videos/windows using, for example, a cursor or the user's finger. When the multiple videos/windows 1802-1808 have been selected, the user may perform one or more actions with regard to the selected videos (e.g., muting/unmuting the videos, creating a group, removing the videos from the stage 210, etc.). As shown in FIG. 18, the user has additionally created a group 1810 called "Group A" that is included in the stage 210 with the selected videos.

Figure 19:
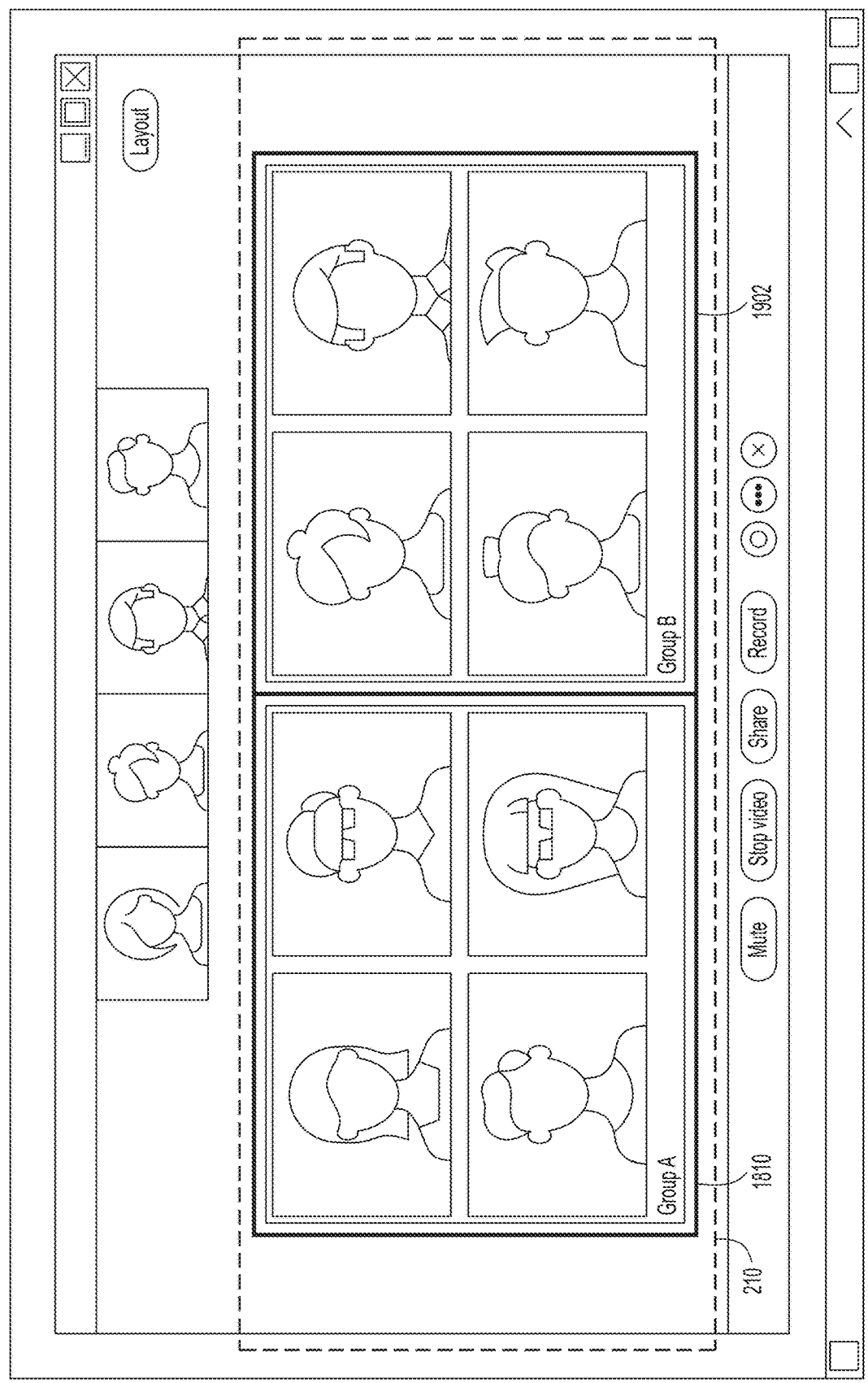
FIG. 19 is a diagram of a user interface screen illustrating displaying multiple groups in the stage, according to an example embodiment.

FIG. 19 illustrates a user interface screen 1900 in which two groups of videos that have been formed in the stage 210. As shown in FIG. 19, the user has created group 1810, called "Group A," and group 1902, called "Group B." Groups 1810 and 1902 are both located in the stage 210. The user may perform actions with respect to participants in each group separately. For example, a user may perform actions with respect to group 1810 by selecting group 1810 or a participant/video in group 1810 and selecting an option on a contextual menu. Similarly, the user may perform actions with respect to group 1902 by selecting group 1902 or a participant/video in group 1902 and selecting an option in a contextual menu.

Figure 20:
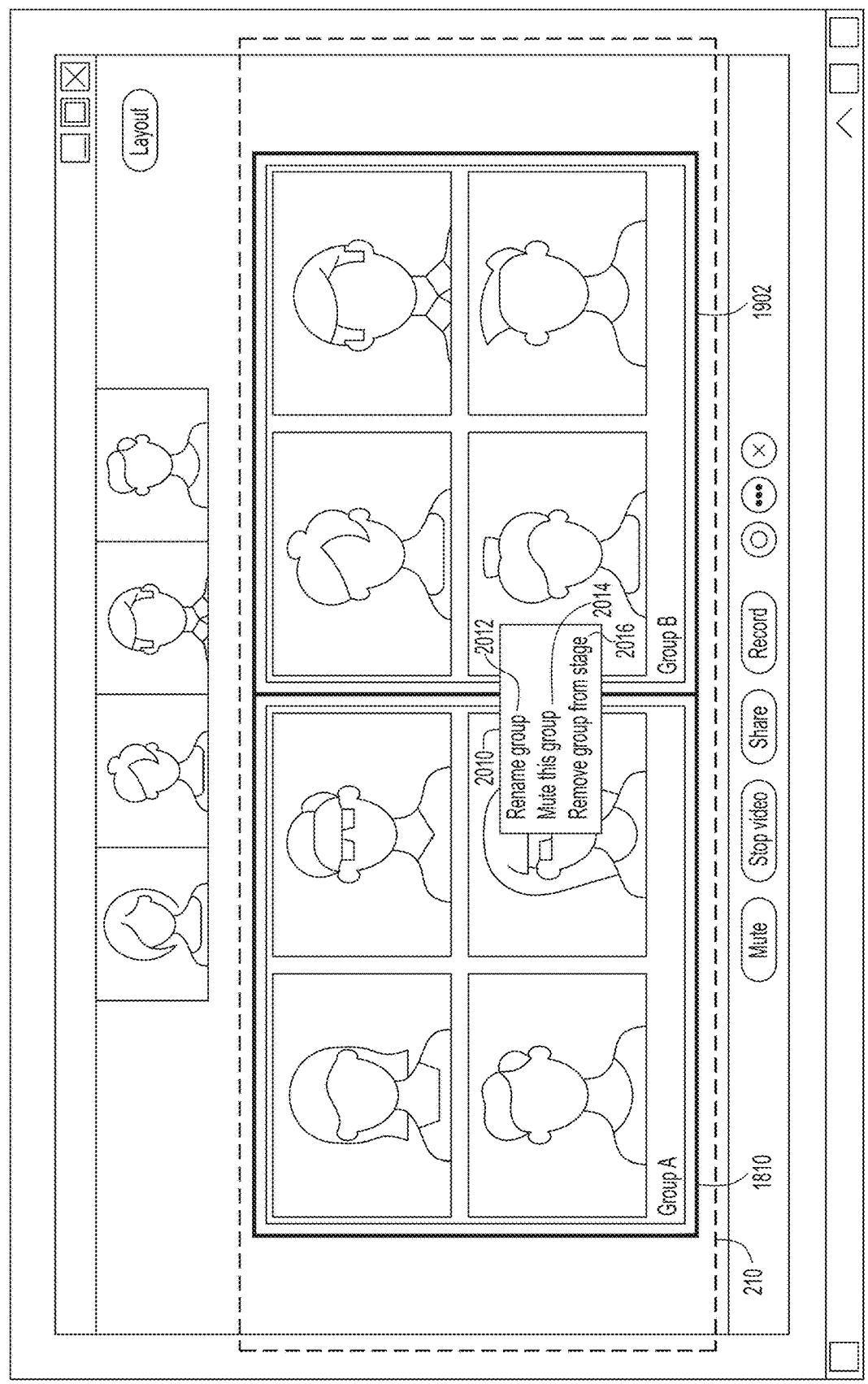
FIG. 20 is a diagram of a user interface screen illustrating a contextual menu displaying actions that may be taken with respect to participants in a group, according to an example embodiment.

FIG. 20 illustrates a user interface screen 2000 that shows examples of actions that may be performed with respect to participants in a group. As shown in FIG. 20, menu 2010 illustrates options that may be performed with respect to members of group 1810, which has been selected by the user. The menu options include a "Remove a group" option 2012, a "Mute the group" option 2014, and a "Remove the group from the stage" option 2016. When a user selects an option from the menu, the action associated with the option will be performed with respect to all participants/videos in the group. For example, if the user chooses the "Mute the group" option 2014, all four members of group 1810 will be muted. Actions performed with respect to group 1810 do not affect participants in other groups, such as group 1902.

Figure 21:
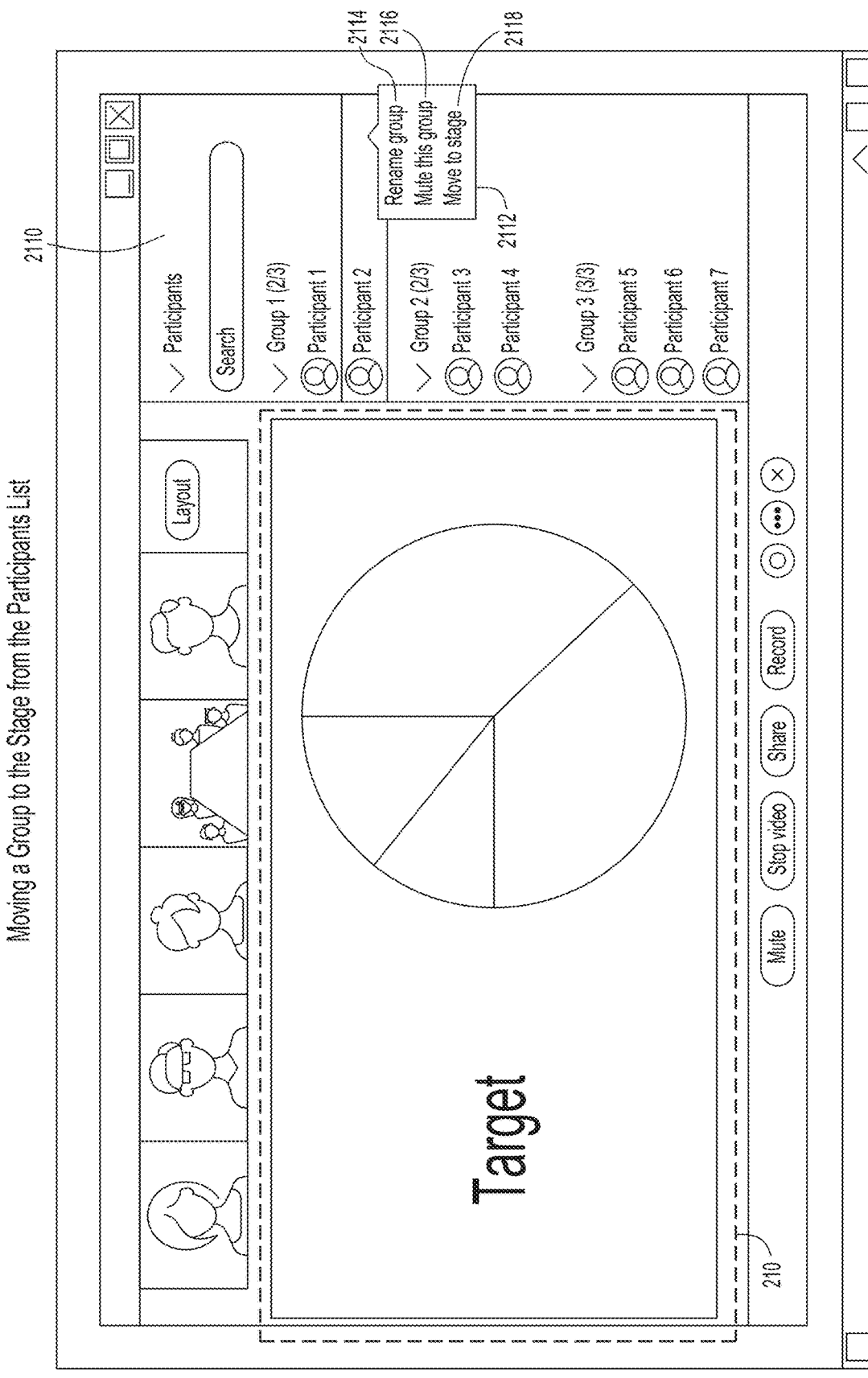
FIG. 21 is a diagram of a user interface screen illustrating a participants list with a contextual menu for moving a group to the stage, according to an example embodiment.

FIG. 21 illustrates a user interface screen 2100 that may be used to move a group to the stage 210 from a participants list 2110. As shown in FIG. 21, the participants list 2110 has been divided into groups. For example, the participants list 2110 includes the group "Group 1" with the participants Participant 1 and Participant 2, the group "Group 2" with the participants Participant 3 and Participant 4, and the group "Group 3" with the participants Participant 5, Participant 6, and Participant 7. A menu 2112 to control a group may be provided when a user selects a group or a participant in a group. For example, the menu 2112 is provided based on the user selecting Participant 2 from the participants list 2110.

The menu 2112 includes several options for actions that may be performed with respect to participants in the same group as Participant 2 (e.g., the group "Group 1"). The menu options include a "Rename group" option 2114, a "Mute this group" option 2116, and a "Move to stage" option 2118. When the user chooses the "Move to stage" option 2118, videos and other content associated with members in the group (e.g., Participant 1 and Participant 2) will be moved to the stage 210. As shown in FIG. 21, two of the three members of the group "Group 1" are participating in the meeting (as illustrated by "Group 1 (2/3)"). If the third participant of the group "Group 1" joins the meeting, actions performed with respect to the group will be performed with respect to the third participant. For example, if the group "Group 1" has been moved to the stage 210, videos or other content associated with the third member will be moved to the stage when the third member joins the meeting.

While the foregoing description related to the grouping aspects have been described as being initiated by manual interactions by a user in a user interface, it is also envisioned that the grouping aspects can be initiated in an automated matter by the meeting server with access to suitable information about the meeting participants, such as an organization directory. For example, participants may be automatically grouped (or suggested for grouping by an indication in a user interface) based on relationships among participants. Examples of such relationships include geographical location (country/city and/or timezone), reporting structure within an organization, expertise in a particular topic or subject matter, current and/or past members of a working/project team, etc. The system may visually indicate certain participants who are suggested to be grouped together, by highlighting color around the participant's video stream, a numbering scheme or other suitable visual indication scheme hierarchically in a participant roster/list.

Referring to FIG. 22, FIG. 22 is a flow diagram illustrating a method 2200 for providing a user interface screen in which a user may customize the content displayed in the stage 210. The method 2200 may be implemented by a user device such as one of meeting endpoints 120-1 to 120-N, one of meeting applications 140-1 to 140-N, and/or meeting server(s) 110 of FIG. 1. For example, one of the meeting server(s) 110 or meeting applications 140-1 to 140-N may implement the method 2200 based on information received from one of the meeting endpoints 120-1 to 120-N.

At 2202, the method 2200 involves connecting a plurality of user devices to a communication session in which a host of the communication session and a plurality of participants of the respective plurality of user devices communicate. For example, meeting server(s) 110 may facilitate an online meeting or communication session among meeting endpoints 120-1 to 120-N in different geographical locations over network(s) 130 using audio and/or video. Meeting endpoints 120-1 to 120-N may display information associated with users of other meeting endpoints 120-1 to 120-N participating in the online meeting and users may be able to communicate with the users of other meeting endpoints 120-1 to 120-N all at the same time or individually. Each meeting endpoint 120-1 to 120-N may display information (e.g., video streams, shared content, etc.) associated with the other participants participating in the communication session.

At 2204, the method 2200 involves providing, to a user device of a first participant, a user interface including a plurality of areas for displaying content associated with the communication session. The user interface includes a first area for displaying focused content (e.g., the stage 210 of FIG. 2). The first area is larger than other areas on the user interface screen. For example, the area of the stage 210 is larger than the areas/windows in filmstrip 212 of FIG. 2.

At 2206, the method 2200 involves receiving, from the first participant, a request to move first content being displayed in a second area of the plurality of areas to be displayed in the first area. For example, a participant may request that a video or other content that is being displayed in filmstrip 212 or another area be moved to the stage 210. The participant may request that the content/video be moved by dragging the content/video to the stage 210 or by choosing a "Move to stage" option from a contextual menu (such as contextual menu 800 in FIG. 8 or contextual menu 1006 in FIG. 10).

At 2208, the method 2200 involves displaying the first content in the first area. For example, the content/video that was previously displayed in the filmstrip 212 or in another area may be displayed in the stage 210.

Figure 23:
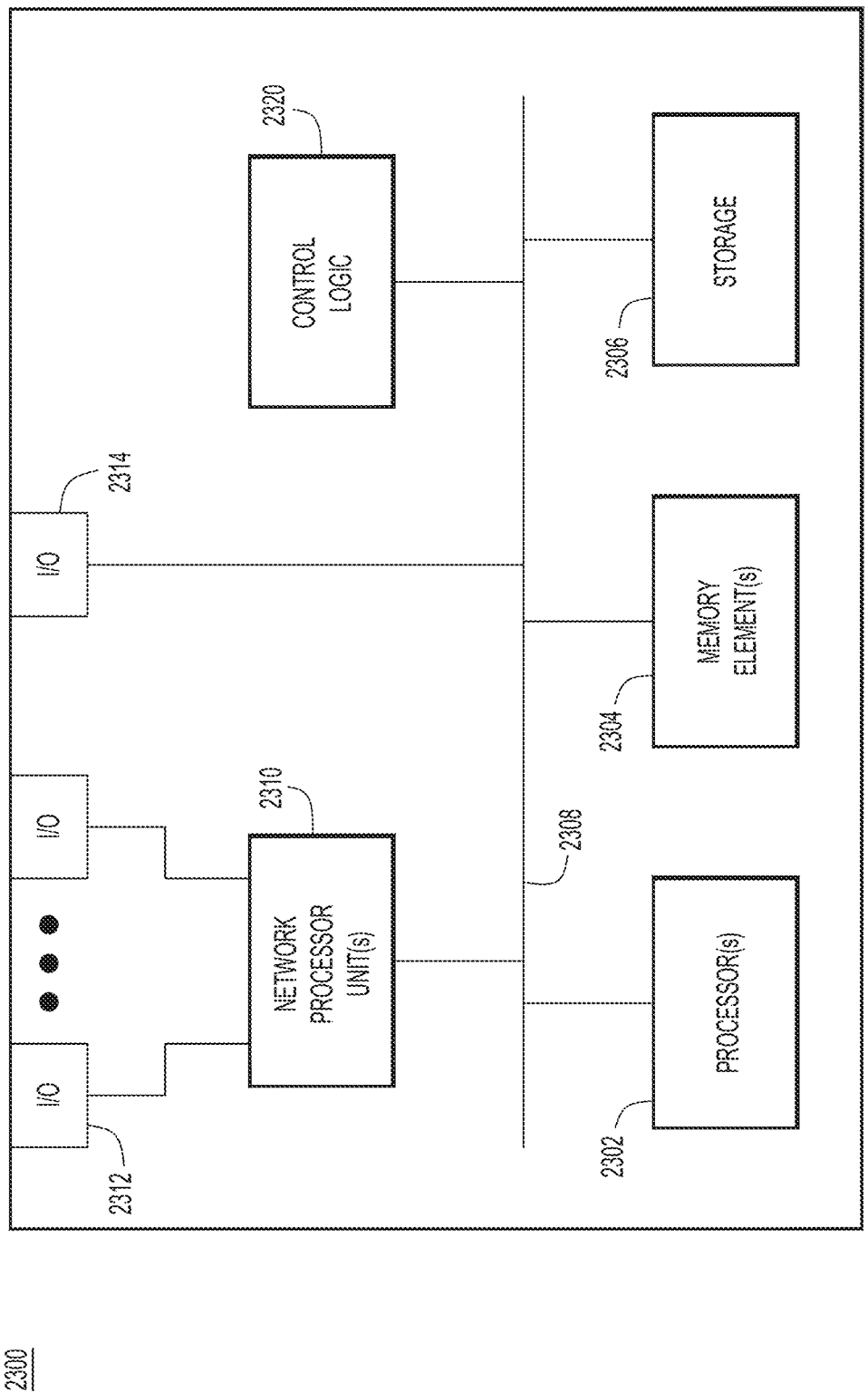
FIG. 23 is a block diagram of a device that may be configured to perform the techniques presented herein.

Referring to FIG. 23, a figure is shown a block diagram of a computing device 2300 that may perform functions associated with operations discussed herein in connection with the techniques depicted in FIGS. 1-22. In various embodiments, a computing device, such as computing device 2300 or any combination of computing devices 2300, may be configured to perform the functions of a client device or meeting server in connection with the techniques of FIGS. 1-22.

In at least one embodiment, the computing device 2300 may include one or more processor(s) 2302, one or more memory element(s) 2304, storage 2306, a bus 2308, one or more network processor unit(s) 2310 interconnected with one or more network input/output (I/O) interface(s) 2312, one or more I/O interface(s) 2314, and control logic 2320. In various embodiments, instructions associated with logic for computing device 2300 can overlap in any manner and are not limited to the specific allocation of instructions and/or operations described herein.

In at least one embodiment, processor(s) 2302 is/are at least one hardware processor configured to execute various tasks, operations and/or functions for computing device 2300 as described herein according to software and/or instructions configured for computing device 2300. Processor(s) 2302 (e.g., a hardware processor) can execute any type of instructions associated with data to achieve the operations detailed herein. In one example, processor(s) 2302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 2304 and/or storage 2306 is/are configured to store data, information, software, and/or instructions associated with computing device 2300, and/or logic configured for memory element(s) 2304 and/or storage 2306. For example, any logic described herein (e.g., control logic 2320) can, in various embodiments, be stored for computing device 2300 using any combination of memory element(s) 2304 and/or storage 2306. Note that in some embodiments, storage 2306 can be consolidated with memory element(s) 2304 (or vice versa), or can overlap/exist in any other suitable manner.

In at least one embodiment, bus 2308 can be configured as an interface that enables one or more elements of computing device 2300 to communicate in order to exchange information and/or data. Bus 2308 can be implemented with any architecture designed for passing control, data and/or information between processors, memory elements/storage, peripheral devices, and/or any other hardware and/or software components that may be configured for computing device 2300. In at least one embodiment, bus 2308 may be implemented as a fast kernel-hosted interconnect, potentially using shared memory between processes (e.g., logic), which can enable efficient communication paths between the processes.

In various embodiments, network processor unit(s) 2310 may enable communication between computing device 2300 and other systems, entities, etc., via network I/O interface(s) 2312 (wired and/or wireless) to facilitate operations discussed for various embodiments described herein. In various embodiments, network processor unit(s) 2310 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 2300 and other systems, entities, etc. to facilitate operations for various embodiments described herein. In various embodiments, network I/O interface(s) 2312 can be configured as one or more Ethernet port(s), Fibre Channel ports, any other I/O port(s), and/or antenna(s)/antenna array(s) now known or hereafter developed. Thus, the network processor unit(s) 2310 and/or network I/O interface(s) 2312 may include suitable interfaces for receiving, transmitting, and/or otherwise communicating data and/or information in a network environment.

I/O interface(s) 2314 allow for input and output of data and/or information with other entities that may be connected to computer device 2300. For example, I/O interface(s) 2314 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 2320 can include instructions that, when executed, cause processor(s) 2302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 2320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 2304 and/or storage 2306 can store data, software, code, instructions (e.g., processor instructions), logic, parameters, combinations thereof, and/or the like used for operations described herein. This includes memory element(s) 2304 and/or storage 2306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided comprising: connecting a plurality of user devices to a communication session in which a host of the communication session and a plurality of participants of the respective plurality of user devices communicate; providing, to a user device of a first participant, a user interface including a plurality of areas for displaying content associated with the communication session, the user interface including a first area for displaying focused content, the first area being larger than other areas of the plurality of areas; receiving, from the first participant, a request to move first content being displayed in a second area of the plurality of areas to be displayed in the first area; and displaying the first content in the first area.

In one example, the method may include receiving a second request to move second content being displayed in a third area of the plurality of areas to be displayed in the first area; and displaying the second content with the first content in the first area. In another example, the method may include receiving a group request to group two or more participants whose video or associated content is displayed in the first area or is to be displayed in the first area, to form a group; forming the group with the two or more participants; receiving an action request to perform an action with respect to the group; and performing the action with respect to the two or more participants in the group. In another example, the action includes muting the two or more participants, unmuting the two or more participants, or moving content associated with the two or more participants to the first area. In another example, the method may include displaying the video or associated content in the first area with an indication that the two or more participants are in the group.

In another example, the method may include receiving a rearrange request to rearrange content in the first area to change a size or location of the content in the first area; and rearranging the content based on the rearrange request. In another example, receiving the request to display the first content in the first area may include receiving a first selection of the first content in the second area; displaying a menu in response to receiving the first selection, the menu including an option to move the first content to the first area; and receiving a second selection of the option to move the first content to the first area. In another example, receiving the request to display the first content in the first area may include receiving a selection of the first content in the second area; and receiving an indication that the first content is being moved from the second area to the first area using a cursor.

In another example, receiving the request to display the first content in the first area may include receiving a first selection of a second participant from a list of the host and the plurality of participants; displaying a menu in response to receiving the first selection, the menu including an option to move content associated with the second participant to the first area; and receiving a second selection of the option to move the content associated with the second participant to the first area. In another example, the first content includes video of a participant or video of multiple participants located in the same room.

In another form, an apparatus is provided comprising a memory; a network interface configured to enable network communications; and a processor, wherein the processor is configured to perform operations comprising: connecting a plurality of user devices to a communication session in which a host of the communication session and a plurality of participants of the respective plurality of user devices communicate; providing, to a user device of a first participant, a user interface including a plurality of areas for displaying content associated with the communication session, the user interface including a first area for displaying focused content, the first area being larger than other areas of the plurality of areas; receiving, from the first participant, a request to move first content being displayed in a second area of the plurality of areas to be displayed in the first area; and displaying the first content in the first area.

In still another form, one or more non-transitory computer-readable storage media encoded with instructions are provided that, when executed by a processor, cause the processor to execute a method comprising: connecting a plurality of user devices to a communication session in which a host of the communication session and a plurality of participants of the respective plurality of user devices communicate; providing, to a user device of a first participant, a user interface including a plurality of areas for displaying content associated with the communication session, the user interface including a first area for displaying focused content, the first area being larger than other areas of the plurality of areas; receiving, from the first participant, a request to move first content being displayed in a second area of the plurality of areas to be displayed in the first area; and displaying the first content in the first area.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi64®), IEEE 802.16 (e.g., Worldwide Interoperability for Microwave Access (WiMAX)), Radio-Frequency Identification (RF ID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and 'one or more of' can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
    connecting a plurality of user devices to a communication session in which a host of the communication session and a plurality of participants of the plurality of user devices communicate;
    providing, to a user device of a first participant, a user interface including a plurality of areas for displaying content associated with the communication session, the user interface including a first area for displaying focused content, the first area being larger than other areas of the plurality of areas;
    receiving, from the first participant, a first request to move first content being displayed in a second area of the plurality of areas to be displayed in the first area;
    receiving, from the first participant, a second request to move second content being displayed in a third area of the plurality of areas to be displayed in the first area;
    displaying the first content and the second content in the first area;
    receiving, from the first participant, a rearrange request to rearrange the first content or the second content in the first area to change a size or location of the first content or the second content in the first area;
    rearranging the first content or the second content based on the rearrange request;
    receiving a group request to group two or more participants who are participating in the communication session to form a group, wherein each of the two or more participants has a video or associated content that is displayed in the first area or is to be displayed in the first area;
    forming the group with the two or more participants;
    receiving an action request to perform an action with respect to each of the two or more participants in the group; and
    performing the action with respect to each of the two or more participants in the group.

2. The computer-implemented method of claim 1, wherein the action includes muting the two or more participants, unmuting the two or more participants, or moving content associated with the two or more participants to the first area.

3. The computer-implemented method of claim 1, further comprising:
    displaying the video or associated content in the first area with an indication that the two or more participants are in the group.

4. The computer-implemented method of claim 1, wherein receiving the first request to display the first content in the first area comprises:
    receiving a first selection of the first content in the second area;
    displaying a menu in response to receiving the first selection, the menu including an option to move the first content to the first area; and
    receiving a second selection of the option to move the first content to the first area.

5. The computer-implemented method of claim 1, wherein receiving the first request to display the first content in the first area comprises:
    receiving a selection of the first content in the second area; and
    receiving an indication that the first content is being moved from the second area to the first area using a cursor.

6. The computer-implemented method of claim 1, wherein receiving the first request to display the first content in the first area comprises:
    receiving a first selection of a second participant from a list of the host and the plurality of participants;
    displaying a menu in response to receiving the first selection, the menu including an option to move content associated with the second participant to the first area; and receiving a second selection of the option to move the content associated with the second participant to the first area.

7. The computer-implemented method of claim 1, wherein the first content includes video of a participant or video of multiple participants located in a same room.

8. An apparatus comprising:
a memory;
a network interface configured to enable network communications; and
a processor, wherein the processor is configured to perform operations comprising:
connecting a plurality of user devices to a communication session in which a host of the communication session and a plurality of participants of the plurality of user devices communicate;
providing, to a user device of a first participant, a user interface including a plurality of areas for displaying content associated with the communication session, the user interface including a first area for displaying focused content, the first area being larger than other areas of the plurality of areas;
receiving, from the first participant, a first request to move first content being displayed in a second area of the plurality of areas to be displayed in the first area;
receiving, from the first participant, a second request to move second content being displayed in a third area of the plurality of areas to be displayed in the first area;
displaying the first content and the second content in the first area;
receiving, from the first participant, a rearrange request to rearrange the first content or the second content in the first area to change a size or location of the first content or the second content in the first area;
rearranging the first content or the second content based on the rearrange request;
receiving a group request to group two or more participants who are participating in the communication session to form a group, wherein each of the two or more participants has a video or associated content that is displayed in the first area or is to be displayed in the first area;
forming the group with the two or more participants;
receiving an action request to perform an action with respect to each of the two or more participants in the group; and
performing the action with respect to each of the two or more participants in the group.

9. The apparatus of claim 8, wherein the processor is configured to perform further operations comprising:
displaying the video or associated content in the first area with an indication that the two or more participants are in the group.

10. The apparatus of claim 8, wherein the first content includes video of a participant or video of multiple participants located in a same room.

11. One or more non-transitory computer-readable storage media encoded with instructions that, when executed by a processor, cause the processor to execute a method comprising:
connecting a plurality of user devices to a communication session in which a host of the communication session and a plurality of participants of the plurality of user devices communicate;
providing, to a user device of a first participant, a user interface including a plurality of areas for displaying content associated with the communication session, the user interface including a first area for displaying focused content, the first area being larger than other areas of the plurality of areas;
receiving, from the first participant, a first request to move first content being displayed in a second area of the plurality of areas to be displayed in the first area;
receiving, from the first participant, a second request to move second content being displayed in a third area of the plurality of areas to be displayed in the first area;
displaying the first content and the second content in the first area;
receiving, from the first participant, a rearrange request to rearrange the first content or the second content in the first area to change a size or location of the first content or the second content in the first area;
rearranging the first content or the second content based on the rearrange request;
receiving a group request to group two or more participants participating in the communication session to form a group, wherein each of the two or more participants has a video or associated content that is displayed in the first area or is to be displayed in the first area;
forming the group with the two or more participants;
receiving an action request to perform an action with respect to each of the two or more participants in the group; and
performing the action with respect to each of the two or more participants in the group.

12. The one or more non-transitory computer-readable storage media of claim 11, wherein the method further comprises:
displaying the video or associated content in the first area with an indication that the two or more participants are in the group.

13. The one or more non-transitory computer-readable storage media of claim 11, wherein the first content includes video of a participant or video of multiple participants located in a same room.

14. The apparatus of claim 8, wherein the action includes muting the two or more participants, unmuting the two or more participants, or moving content associated with the two or more participants to the first area.

15. The apparatus of claim 8, wherein, when receiving the first request, the processor is configured to perform further operations comprising:
receiving a selection of the first content in the second area; and
receiving an indication that the first content is being moved from the second area to the first area using a cursor.

16. The one or more non-transitory computer-readable storage media of claim 11, wherein the action includes muting the two or more participants, unmuting the two or more participants, or moving content associated with the two or more participants to the first area.

17. The one or more non-transitory computer-readable storage media of claim 11, wherein receiving the first request further comprises:
receiving a selection of the first content in the second area; and
receiving an indication that the first content is being moved from the second area to the first area using a cursor.

18. The apparatus of claim 8, wherein, when receiving the first request, the processor is further configured to perform operations comprising:
- receiving a first selection of the first content in the second area;
- displaying a menu in response to receiving the first selection, the menu including an option to move the first content to the first area; and
- receiving a second selection of the option to move the first content to the first area.

19. The apparatus of claim 8, wherein, when receiving the first request, the processor is further configured to perform operations comprising:
- receiving a first selection of a second participant from a list of the host and the plurality of participants;
- displaying a menu in response to receiving the first selection, the menu including an option to move content associated with the second participant to the first area; and
- receiving a second selection of the option to move the content associated with the second participant to the first area.

20. The one or more non-transitory computer-readable storage media of claim 11, wherein receiving the first request comprises:
- receiving a first selection of the first content in the second area;
- displaying a menu in response to receiving the first selection, the menu including an option to move the first content to the first area; and
- receiving a second selection of the option to move the first content to the first area.

\* \* \* \* \*